(12) United States Patent
Nishimura et al.

(10) Patent No.: US 8,139,895 B2
(45) Date of Patent: Mar. 20, 2012

(54) IMAGE RECOGNITION DEVICE AND IMAGE ROTATING METHOD

(75) Inventors: Satoshi Nishimura, Yokohama (JP); Taku Katagiri, Kawasaki (JP); Jou Tanji, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1005 days.

(21) Appl. No.: 12/050,513

(22) Filed: Mar. 18, 2008

(65) Prior Publication Data

US 2008/0232717 A1  Sep. 25, 2008

(30) Foreign Application Priority Data

Mar. 22, 2007  (JP) ................................. 2007-075496

(51) Int. Cl.
*G06K 9/32* (2006.01)
*G09G 5/00* (2006.01)
(52) U.S. Cl. .......................... 382/296; 345/649; 382/300
(58) Field of Classification Search .................. 382/181, 382/289–300, 303, 305, 312; 345/606, 609, 345/649, 660, 686; 358/1.2, 474, 525, 528
See application file for complete search history.

(56) References Cited

U.S. PATENT DOCUMENTS

| | | | | |
|---|---|---|---|---|
| 5,111,192 A | * | 5/1992 | Kadakia | 345/658 |
| 5,793,378 A | * | 8/1998 | Truong et al. | 345/649 |
| 5,966,138 A | * | 10/1999 | Tanaka | 345/658 |
| 6,097,855 A | * | 8/2000 | Levien | 382/296 |
| 6,643,415 B1 | * | 11/2003 | Fukai et al. | 382/296 |
| 7,215,830 B2 | * | 5/2007 | Knee et al. | 382/293 |
| 7,345,784 B2 | * | 3/2008 | Osawa et al. | 358/1.2 |
| 7,391,930 B2 | * | 6/2008 | Shih et al. | 382/289 |
| 7,411,593 B2 | * | 8/2008 | Prakash et al. | 345/611 |

FOREIGN PATENT DOCUMENTS

| | | |
|---|---|---|
| JP | 06-333032 | 12/1994 |
| JP | 10-222655 | 8/1998 |
| JP | 11-205576 | 7/1999 |
| JP | 11-252353 | 9/1999 |
| JP | 2002-288649 | 10/2002 |
| JP | 2006-013803 | 1/2006 |

OTHER PUBLICATIONS

Japanese Office Action issued Jun. 28, 2011 in related Japanese Patent Application No. 2007-075496 (3 pages) (2 pages English Translation).

* cited by examiner

*Primary Examiner* — Kanjibhai Patel
(74) *Attorney, Agent, or Firm* — Staas & Halsey LLP

(57) ABSTRACT

An image recognition device for generating an output rotation image from input original image data, including a memory section being capable of storing data of a line including pixels of the original image data to be processed, an angle-to-sine/cosine converting section obtaining an X component and a Y component where a pixel interval of the original image data is an oblique side based on a rotating angle, and a coordinate searching section calculating a reference coordinate of the output rotation image for the original image using the X component and the Y component in order of input of the original image data and outputting data of the output rotation image based upon the reference coordinate.

13 Claims, 26 Drawing Sheets

FIG. 9

| ANGLE | 100% | | 110% | | 120% | | 130% | | 140% | | ENLARGEMENT FACTOR 150% | | 160% | | 170% | | 180% | | 190% | | 200% | |
|---|---|---|---|---|---|---|---|---|---|---|---|---|---|---|---|---|---|---|---|---|---|---|
| | X | Y | X | Y | X | Y | X | Y | X | Y | X | Y | X | Y | X | Y | X | Y | X | Y | X | Y |
| 0 | 65536 | 0 | 59578 | 0 | 59578 | 0 | 50412 | 0 | 46811 | 0 | 43691 | 0 | 40960 | 0 | 38551 | 0 | 36409 | 0 | 34493 | 0 | 32768 | 0 |
| 1 | 65526 | 1144 | 59569 | 1040 | 59569 | 1040 | 50404 | 880 | 46804 | 817 | 43684 | 763 | 40954 | 715 | 38545 | 673 | 36403 | 635 | 34488 | 602 | 32763 | 572 |
| 2 | 65496 | 2287 | 59542 | 2079 | 59542 | 2079 | 50381 | 1759 | 46782 | 1634 | 43664 | 1525 | 40935 | 1429 | 38528 | 1345 | 36387 | 1271 | 34472 | 1204 | 32748 | 1144 |
| 3 | 65446 | 3430 | 59496 | 3118 | 59496 | 3118 | 50343 | 2638 | 46747 | 2450 | 43631 | 2287 | 40904 | 2144 | 38498 | 2018 | 36359 | 1905 | 34446 | 1805 | 32723 | 1715 |
| 4 | 65376 | 4572 | 59433 | 4156 | 59433 | 4156 | 50289 | 3517 | 46697 | 3265 | 43585 | 3048 | 40860 | 2857 | 38457 | 2689 | 36320 | 2540 | 34409 | 2406 | 32688 | 2286 |
| 5 | 65287 | 5712 | 59351 | 5193 | 59351 | 5193 | 50220 | 4394 | 46633 | 4080 | 43525 | 3808 | 40804 | 3570 | 38404 | 3360 | 36270 | 3173 | 34362 | 3006 | 32643 | 2856 |
| 6 | 65177 | 6850 | 59252 | 6228 | 59252 | 6228 | 50136 | 5269 | 46555 | 4893 | 43452 | 4567 | 40736 | 4281 | 38340 | 4030 | 36210 | 3806 | 34304 | 3606 | 32588 | 3425 |
| 7 | 65048 | 7987 | 59134 | 7261 | 59134 | 7261 | 50036 | 6144 | 46462 | 5705 | 43365 | 5325 | 40655 | 4992 | 38264 | 4698 | 36138 | 4437 | 34236 | 4204 | 32524 | 3993 |
| 8 | 64898 | 9121 | 58998 | 8292 | 58998 | 8292 | 49921 | 7016 | 46355 | 6515 | 43266 | 6081 | 40561 | 5701 | 38176 | 5365 | 36055 | 5067 | 34157 | 4800 | 32449 | 4560 |
| 9 | 64729 | 10252 | 58844 | 9320 | 58844 | 9320 | 49791 | 7886 | 46235 | 7323 | 43153 | 6835 | 40456 | 6408 | 38076 | 6031 | 35961 | 5696 | 34068 | 5396 | 32365 | 5126 |
| 10 | 64540 | 11380 | 58673 | 10346 | 58673 | 10346 | 49646 | 8754 | 46100 | 8129 | 43027 | 7587 | 40338 | 7113 | 37965 | 6694 | 35856 | 6322 | 33969 | 5990 | 32270 | 5690 |
| 11 | 64332 | 12505 | 58483 | 11368 | 58483 | 11368 | 49486 | 9619 | 45951 | 8932 | 42888 | 8337 | 40207 | 7816 | 37843 | 7356 | 35740 | 6947 | 33859 | 6582 | 32166 | 6252 |
| 12 | 64104 | 13626 | 58276 | 12387 | 58276 | 12387 | 49310 | 10481 | 45788 | 9733 | 42736 | 9084 | 40065 | 8516 | 37709 | 8015 | 35613 | 7570 | 33739 | 7171 | 32052 | 6813 |
| 13 | 63856 | 14742 | 58051 | 13402 | 58051 | 13402 | 49120 | 11340 | 45611 | 10530 | 42571 | 9828 | 39910 | 9214 | 37563 | 8672 | 35476 | 8190 | 33609 | 7759 | 31928 | 7371 |
| 14 | 63589 | 15855 | 57808 | 14413 | 57808 | 14413 | 48915 | 12196 | 45421 | 11325 | 42393 | 10570 | 39743 | 9909 | 37406 | 9326 | 35327 | 8808 | 33468 | 8345 | 31795 | 7927 |
| 15 | 63303 | 16962 | 57548 | 15420 | 57548 | 15420 | 48694 | 13048 | 45216 | 12116 | 42202 | 11308 | 39564 | 10601 | 37237 | 9978 | 35168 | 9423 | 33318 | 8927 | 31651 | 8481 |
| 16 | 62997 | 18064 | 57270 | 16422 | 57270 | 16422 | 48459 | 13895 | 44998 | 12903 | 41998 | 12043 | 39373 | 11290 | 37058 | 10626 | 34999 | 10036 | 33157 | 9508 | 31499 | 9032 |
| 17 | 62672 | 19161 | 56975 | 17419 | 56975 | 17419 | 48209 | 14739 | 44766 | 13686 | 41782 | 12774 | 39170 | 11976 | 36864 | 11271 | 34818 | 10645 | 32986 | 10085 | 31336 | 9580 |
| 18 | 62328 | 20252 | 56662 | 18411 | 56662 | 18411 | 47945 | 15578 | 44520 | 14465 | 41553 | 13501 | 38955 | 12657 | 36664 | 11913 | 34627 | 11251 | 32805 | 10659 | 31164 | 10126 |
| 19 | 61966 | 21336 | 56332 | 19397 | 56332 | 19397 | 47665 | 16413 | 44261 | 15240 | 41311 | 14224 | 38728 | 13335 | 36451 | 12551 | 34425 | 11854 | 32614 | 11230 | 30983 | 10668 |
| 20 | 61584 | 22415 | 55985 | 20377 | 55985 | 20377 | 47364 | 17242 | 43988 | 16010 | 41056 | 14943 | 38490 | 14009 | 36226 | 13185 | 34213 | 12453 | 32413 | 11797 | 30792 | 11207 |
| 21 | 61183 | 23486 | 55621 | 21351 | 55621 | 21351 | 47064 | 18066 | 43702 | 16776 | 40789 | 15657 | 38239 | 14679 | 35990 | 13815 | 33991 | 13048 | 32202 | 12361 | 30592 | 11743 |
| 22 | 60764 | 24550 | 55240 | 22318 | 55240 | 22318 | 46741 | 18885 | 43402 | 17536 | 40510 | 16367 | 37977 | 15344 | 35744 | 14441 | 33758 | 13639 | 31981 | 12921 | 30382 | 12275 |
| 23 | 60326 | 25607 | 54842 | 23279 | 54842 | 23279 | 46404 | 19698 | 43090 | 18291 | 40218 | 17071 | 37704 | 16004 | 35486 | 15063 | 33515 | 14226 | 31751 | 13477 | 30163 | 12803 |
| 24 | 59870 | 26656 | 54427 | 24233 | 54427 | 24233 | 46054 | 20504 | 42764 | 19040 | 39914 | 17771 | 37419 | 16660 | 35218 | 15680 | 33261 | 14809 | 31511 | 14030 | 29935 | 13328 |
| 25 | 59396 | 27697 | 53996 | 25179 | 53996 | 25179 | 45689 | 21305 | 42425 | 19783 | 39597 | 18465 | 37122 | 17310 | 34939 | 16292 | 32998 | 15387 | 31261 | 14577 | 29698 | 13848 |
| 26 | 58903 | 28729 | 53548 | 26117 | 53548 | 26117 | 45310 | 22099 | 42073 | 20521 | 39269 | 19153 | 36815 | 17956 | 34649 | 16900 | 32724 | 15961 | 31000 | 15121 | 29452 | 14365 |
| 27 | 58393 | 29753 | 53084 | 27048 | 53084 | 27048 | 44917 | 22887 | 41709 | 21252 | 38929 | 19835 | 36496 | 18595 | 34349 | 17502 | 32441 | 16529 | 30733 | 15659 | 29197 | 14876 |
| 28 | 57865 | 30767 | 52604 | 27970 | 52604 | 27970 | 44511 | 23667 | 41332 | 21976 | 38577 | 20512 | 36166 | 19230 | 34039 | 18099 | 32147 | 17093 | 30456 | 16193 | 28932 | 15384 |
| 29 | 57319 | 31772 | 52108 | 28884 | 52108 | 28884 | 44091 | 24440 | 40942 | 22694 | 38213 | 21182 | 35824 | 19858 | 33717 | 18690 | 31844 | 17651 | 30168 | 16723 | 28660 | 15886 |
| 30 | 56756 | 32768 | 51596 | 29789 | 51596 | 29789 | 43658 | 25206 | 40540 | 23406 | 37838 | 21846 | 35472 | 20480 | 33386 | 19276 | 31531 | 18205 | 29872 | 17247 | 28378 | 16384 |

FIG. 10

| ANGLE | \multicolumn{2}{c|}{100%} | \multicolumn{2}{c|}{110%} | \multicolumn{2}{c|}{120%} | \multicolumn{2}{c|}{130%} | \multicolumn{2}{c|}{140%} | \multicolumn{2}{c|}{150%} | \multicolumn{2}{c|}{160%} | \multicolumn{2}{c|}{170%} | \multicolumn{2}{c|}{180%} | \multicolumn{2}{c|}{190%} | \multicolumn{2}{c|}{200%} |
|---|---|---|---|---|---|---|---|---|---|---|---|---|---|---|---|---|---|---|---|---|---|
| | X | Y | X | Y | X | Y | X | Y | X | Y | X | Y | X | Y | X | Y | X | Y | X | Y | X | Y |
| 31 | 56175 | 33754 | 51068 | 30685 | 51068 | 30685 | 43212 | 25964 | 40125 | 24109 | 37450 | 22503 | 35110 | 21096 | 33045 | 19855 | 31209 | 18752 | 29566 | 17765 | 28088 | 16877 |
| 32 | 55578 | 34729 | 50525 | 31572 | 50525 | 31572 | 42752 | 26714 | 39698 | 24806 | 37052 | 23153 | 34736 | 21705 | 32693 | 20429 | 30877 | 19294 | 29252 | 18279 | 27789 | 17364 |
| 33 | 54963 | 35693 | 49966 | 32449 | 49966 | 32449 | 42279 | 27456 | 39259 | 25495 | 36642 | 23796 | 34352 | 22308 | 32332 | 20996 | 30535 | 19830 | 28928 | 18786 | 27482 | 17847 |
| 34 | 54332 | 36647 | 49392 | 33316 | 49392 | 33316 | 41793 | 28190 | 38808 | 26176 | 36221 | 24432 | 33957 | 22905 | 31960 | 21557 | 30184 | 20360 | 28596 | 19288 | 27166 | 18324 |
| 35 | 53684 | 37590 | 48803 | 34173 | 48803 | 34173 | 41295 | 28915 | 38345 | 26850 | 35790 | 25060 | 33552 | 23494 | 31579 | 22112 | 29825 | 20883 | 28255 | 19784 | 26842 | 18795 |
| 36 | 53020 | 38521 | 48200 | 35019 | 48200 | 35019 | 40784 | 29631 | 37871 | 27515 | 35347 | 25681 | 33137 | 24076 | 31188 | 22660 | 29455 | 21401 | 27905 | 20274 | 26510 | 19261 |
| 37 | 52339 | 39441 | 47581 | 35855 | 47581 | 35855 | 40261 | 30339 | 37385 | 28172 | 34893 | 26294 | 32712 | 24650 | 30788 | 23201 | 29078 | 21911 | 27547 | 20758 | 26170 | 19720 |
| 38 | 51643 | 40348 | 46948 | 36680 | 46948 | 36680 | 39725 | 31037 | 36888 | 28820 | 34429 | 26899 | 32277 | 25217 | 30379 | 23734 | 28691 | 22416 | 27181 | 21236 | 25822 | 20174 |
| 39 | 50931 | 41243 | 46301 | 37494 | 46301 | 37494 | 39177 | 31725 | 36379 | 29459 | 33954 | 27496 | 31832 | 25777 | 29960 | 24261 | 28295 | 22913 | 26806 | 21707 | 25466 | 20622 |
| 40 | 50203 | 42126 | 45639 | 38296 | 45639 | 38296 | 38618 | 32404 | 35859 | 30090 | 33469 | 28084 | 31377 | 26329 | 29532 | 24780 | 27891 | 23403 | 26423 | 22172 | 25102 | 21063 |
| 41 | 49461 | 42995 | 44964 | 39087 | 44964 | 39087 | 38046 | 33073 | 35329 | 30711 | 32974 | 28664 | 30913 | 26872 | 29095 | 25292 | 27478 | 23886 | 26032 | 22629 | 24730 | 21498 |
| 42 | 48703 | 43852 | 44275 | 39865 | 44275 | 39865 | 37463 | 33732 | 34787 | 31323 | 32469 | 29235 | 30439 | 27408 | 28649 | 25796 | 27057 | 24362 | 25633 | 23080 | 24351 | 21926 |
| 43 | 47930 | 44695 | 43573 | 40632 | 43573 | 40632 | 36869 | 34381 | 34235 | 31925 | 31954 | 29797 | 29956 | 27935 | 28194 | 26292 | 26628 | 24831 | 25227 | 23524 | 23965 | 22348 |
| 44 | 47143 | 45525 | 42857 | 41386 | 42857 | 41386 | 36263 | 35019 | 33673 | 32518 | 31429 | 30350 | 29464 | 28453 | 27731 | 26780 | 26190 | 25292 | 24812 | 23961 | 23571 | 22763 |
| 45 | 46341 | 46341 | 42128 | 42128 | 42128 | 42128 | 35647 | 35647 | 33100 | 33100 | 30894 | 30894 | 28963 | 28963 | 27260 | 27260 | 25745 | 25745 | 24390 | 24390 | 23170 | 23170 |
| 46 | 45525 | 47143 | 41386 | 42857 | 41386 | 42857 | 35019 | 36263 | 32518 | 33673 | 30350 | 31429 | 28453 | 29464 | 26780 | 27731 | 25292 | 26190 | 23961 | 24812 | 22763 | 23571 |
| 47 | 44695 | 47930 | 40632 | 43573 | 40632 | 43573 | 34381 | 36869 | 31925 | 34235 | 29797 | 31954 | 27935 | 29956 | 26292 | 28194 | 24831 | 26628 | 23524 | 25227 | 22348 | 23965 |
| 48 | 43852 | 48703 | 39865 | 44275 | 39865 | 44275 | 33732 | 37463 | 31323 | 34787 | 29235 | 32469 | 27408 | 30439 | 25796 | 28649 | 24362 | 27057 | 23080 | 25633 | 21926 | 24351 |
| 49 | 42995 | 49461 | 39087 | 44964 | 39087 | 44964 | 33073 | 38046 | 30711 | 35329 | 28664 | 32974 | 26872 | 30913 | 25292 | 29095 | 23886 | 27478 | 22629 | 26032 | 21498 | 24730 |
| 50 | 42126 | 50203 | 38296 | 45639 | 38296 | 45639 | 32404 | 38618 | 30090 | 35859 | 28084 | 33469 | 26329 | 31377 | 24780 | 29532 | 23403 | 27891 | 22172 | 26423 | 21063 | 25102 |
| 51 | 41243 | 50931 | 37494 | 46301 | 37494 | 46301 | 31725 | 39177 | 29459 | 36379 | 27496 | 33954 | 25777 | 31832 | 24261 | 29960 | 22913 | 28295 | 21707 | 26806 | 20622 | 25466 |
| 52 | 40348 | 51643 | 36680 | 46948 | 36680 | 46948 | 31037 | 39725 | 28820 | 36888 | 26899 | 34429 | 25217 | 32277 | 23734 | 30379 | 22416 | 28691 | 21236 | 27181 | 20174 | 25822 |
| 53 | 39441 | 52339 | 35855 | 47581 | 35855 | 47581 | 30339 | 40261 | 28172 | 37385 | 26294 | 34893 | 24650 | 32712 | 23201 | 30788 | 21911 | 29078 | 20758 | 27547 | 19720 | 26170 |
| 54 | 38521 | 53020 | 35019 | 48200 | 35019 | 48200 | 29631 | 40784 | 27515 | 37871 | 25681 | 35347 | 24076 | 33137 | 22660 | 31188 | 21401 | 29455 | 20274 | 27905 | 19261 | 26510 |
| 55 | 37590 | 53684 | 34173 | 48803 | 34173 | 48803 | 28915 | 41295 | 26850 | 38345 | 25060 | 35790 | 23494 | 33552 | 22112 | 31579 | 20883 | 29825 | 19784 | 28255 | 18795 | 26842 |
| 56 | 36647 | 54332 | 33316 | 49392 | 33316 | 49392 | 28190 | 41793 | 26176 | 38808 | 24432 | 36221 | 22905 | 33957 | 21557 | 31960 | 20360 | 30184 | 19288 | 28596 | 18324 | 27166 |
| 57 | 35693 | 54963 | 32449 | 49966 | 32449 | 49966 | 27456 | 42279 | 25495 | 39259 | 23796 | 36642 | 22308 | 34352 | 20996 | 32332 | 19830 | 30535 | 18786 | 28928 | 17847 | 27482 |
| 58 | 34729 | 55578 | 31572 | 50525 | 31572 | 50525 | 26714 | 42752 | 24806 | 39698 | 23153 | 37052 | 21705 | 34736 | 20429 | 32693 | 19294 | 30877 | 18279 | 29252 | 17364 | 27789 |
| 59 | 33754 | 56175 | 30685 | 51068 | 30685 | 51068 | 25964 | 43212 | 24109 | 40125 | 22503 | 37450 | 21096 | 35110 | 19855 | 33045 | 18752 | 31209 | 17765 | 29566 | 16877 | 28088 |
| 60 | 32768 | 56756 | 29789 | 51596 | 29789 | 51596 | 25206 | 43658 | 23406 | 40540 | 21846 | 37838 | 20480 | 35472 | 19276 | 33386 | 18205 | 31531 | 17247 | 29872 | 16384 | 28378 |

FIG. 11

| ANGLE | 100% | | 110% | | 120% | | 130% | | 140% | | ENLARGEMENT FACTOR 150% | | 160% | | 170% | | 180% | | 190% | | 200% | |
|---|---|---|---|---|---|---|---|---|---|---|---|---|---|---|---|---|---|---|---|---|---|---|
| | X | Y | X | Y | X | Y | X | Y | X | Y | X | Y | X | Y | X | Y | X | Y | X | Y | X | Y |
| 61 | 31772 | 57319 | 28884 | 52108 | 28884 | 52108 | 24440 | 44091 | 22694 | 40942 | 21182 | 38213 | 19858 | 35824 | 18690 | 33717 | 17651 | 31844 | 16723 | 30168 | 15886 | 28660 |
| 62 | 30767 | 57865 | 27970 | 52604 | 27970 | 52604 | 23667 | 44511 | 21976 | 41332 | 20512 | 38577 | 19230 | 36166 | 18099 | 34039 | 17093 | 32147 | 16193 | 30456 | 15384 | 28932 |
| 63 | 29753 | 58393 | 27048 | 53084 | 27048 | 53084 | 22887 | 44917 | 21252 | 41709 | 19835 | 38929 | 18595 | 36496 | 17502 | 34349 | 16529 | 32441 | 15659 | 30733 | 14876 | 29197 |
| 64 | 28729 | 58903 | 26117 | 53548 | 26117 | 53548 | 22099 | 45310 | 20521 | 42073 | 19153 | 39269 | 17956 | 36815 | 16900 | 34649 | 15961 | 32724 | 15121 | 31002 | 14365 | 29452 |
| 65 | 27697 | 59396 | 25179 | 53996 | 25179 | 53996 | 21305 | 45689 | 19783 | 42425 | 18465 | 39597 | 17310 | 37122 | 16292 | 34939 | 15387 | 32998 | 14577 | 31261 | 13848 | 29698 |
| 66 | 26656 | 59870 | 24233 | 54427 | 24233 | 54427 | 20504 | 46054 | 19040 | 42764 | 17771 | 39914 | 16660 | 37419 | 15680 | 35218 | 14809 | 33261 | 14030 | 31511 | 13328 | 29935 |
| 67 | 25607 | 60326 | 23279 | 54842 | 23279 | 54842 | 19698 | 46404 | 18291 | 43090 | 17071 | 40218 | 16004 | 37704 | 15063 | 35486 | 14226 | 33515 | 13477 | 31751 | 12803 | 30163 |
| 68 | 24550 | 60764 | 22318 | 55240 | 22318 | 55240 | 18885 | 46741 | 17536 | 43402 | 16367 | 40510 | 15344 | 37977 | 14441 | 35744 | 13639 | 33758 | 12921 | 31981 | 12275 | 30382 |
| 69 | 23486 | 61183 | 21351 | 55621 | 21351 | 55621 | 18066 | 47064 | 16776 | 43702 | 15657 | 40789 | 14679 | 38239 | 13815 | 35990 | 13048 | 33991 | 12361 | 32202 | 11743 | 30592 |
| 70 | 22415 | 61584 | 20377 | 55985 | 20377 | 55985 | 17242 | 47372 | 16010 | 43988 | 14943 | 41056 | 14009 | 38490 | 13185 | 36226 | 12453 | 34213 | 11797 | 32413 | 11207 | 30792 |
| 71 | 21336 | 61966 | 19397 | 56332 | 19397 | 56332 | 16413 | 47665 | 15240 | 44261 | 14224 | 41311 | 13335 | 38728 | 12551 | 36451 | 11854 | 34425 | 11230 | 32614 | 10668 | 30983 |
| 72 | 20252 | 62328 | 18411 | 56662 | 18411 | 56662 | 15578 | 47945 | 14465 | 44520 | 13501 | 41553 | 12657 | 38955 | 11913 | 36664 | 11251 | 34627 | 10659 | 32805 | 10126 | 31164 |
| 73 | 19161 | 62672 | 17419 | 56975 | 17419 | 56975 | 14739 | 48209 | 13686 | 44766 | 12774 | 41782 | 11976 | 39170 | 11271 | 36867 | 10645 | 34818 | 10085 | 32986 | 9580 | 31336 |
| 74 | 18064 | 62997 | 16422 | 57270 | 16422 | 57270 | 13895 | 48459 | 12903 | 44998 | 12043 | 41998 | 11290 | 39373 | 10626 | 37058 | 10036 | 34999 | 9508 | 33157 | 9032 | 31499 |
| 75 | 16962 | 63303 | 15420 | 57548 | 15420 | 57548 | 13048 | 48694 | 12116 | 45216 | 11308 | 42202 | 10601 | 39564 | 9978 | 37237 | 9423 | 35168 | 8927 | 33318 | 8481 | 31651 |
| 76 | 15855 | 63589 | 14413 | 57808 | 14413 | 57808 | 12196 | 48915 | 11325 | 45421 | 10570 | 42393 | 9909 | 39743 | 9326 | 37406 | 8808 | 35327 | 8345 | 33468 | 7927 | 31795 |
| 77 | 14742 | 63856 | 13402 | 58051 | 13402 | 58051 | 11340 | 49120 | 10530 | 45611 | 9828 | 42571 | 9214 | 39910 | 8672 | 37563 | 8190 | 35476 | 7759 | 33609 | 7371 | 31928 |
| 78 | 13626 | 64104 | 12387 | 58276 | 12387 | 58276 | 10481 | 49310 | 9733 | 45788 | 9084 | 42736 | 8516 | 40065 | 8015 | 37709 | 7570 | 35613 | 7171 | 33739 | 6813 | 32052 |
| 79 | 12505 | 64332 | 11368 | 58483 | 11368 | 58483 | 9619 | 49486 | 8932 | 45951 | 8337 | 42888 | 7816 | 40207 | 7356 | 37843 | 6947 | 35740 | 6582 | 33859 | 6252 | 32166 |
| 80 | 11380 | 64540 | 10346 | 58673 | 10346 | 58673 | 8754 | 49646 | 8129 | 46100 | 7587 | 43027 | 7113 | 40338 | 6694 | 37965 | 6322 | 35856 | 5990 | 33969 | 5690 | 32270 |
| 81 | 10252 | 64729 | 9320 | 58844 | 9320 | 58844 | 7886 | 49791 | 7323 | 46235 | 6835 | 43153 | 6408 | 40456 | 6031 | 38076 | 5696 | 35961 | 5396 | 34068 | 5126 | 32365 |
| 82 | 9121 | 64898 | 8292 | 58998 | 8292 | 58998 | 7016 | 49921 | 6515 | 46355 | 6081 | 43266 | 5701 | 40561 | 5365 | 38176 | 5067 | 36055 | 4800 | 34157 | 4560 | 32449 |
| 83 | 7987 | 65048 | 7261 | 59134 | 7261 | 59134 | 6144 | 50036 | 5705 | 46462 | 5325 | 43365 | 4992 | 40655 | 4698 | 38264 | 4437 | 36138 | 4204 | 34236 | 3993 | 32524 |
| 84 | 6850 | 65177 | 6228 | 59252 | 6228 | 59252 | 5269 | 50136 | 4893 | 46555 | 4567 | 43452 | 4281 | 40736 | 4030 | 38340 | 3806 | 36210 | 3606 | 34304 | 3425 | 32588 |
| 85 | 5712 | 65287 | 5193 | 59351 | 5193 | 59351 | 4394 | 50220 | 4080 | 46633 | 3808 | 43525 | 3570 | 40804 | 3360 | 38404 | 3173 | 36270 | 3006 | 34362 | 2856 | 32643 |
| 86 | 4572 | 65376 | 4156 | 59433 | 4156 | 59433 | 3517 | 50289 | 3265 | 46697 | 3048 | 43585 | 2857 | 40860 | 2689 | 38457 | 2540 | 36320 | 2406 | 34409 | 2286 | 32688 |
| 87 | 3430 | 65446 | 3118 | 59496 | 3118 | 59496 | 2638 | 50343 | 2450 | 46747 | 2287 | 43631 | 2144 | 40904 | 2018 | 38498 | 1905 | 36359 | 1805 | 34446 | 1715 | 32723 |
| 88 | 2287 | 65496 | 2079 | 59542 | 2079 | 59542 | 1759 | 50381 | 1634 | 46782 | 1525 | 43664 | 1429 | 40935 | 1345 | 38528 | 1271 | 36387 | 1204 | 34472 | 1144 | 32748 |
| 89 | 1144 | 65526 | 1040 | 59569 | 1040 | 59569 | 880 | 50404 | 817 | 46804 | 763 | 43684 | 715 | 40954 | 673 | 38545 | 635 | 36403 | 602 | 34488 | 572 | 32763 |
| 90 | 0 | 65536 | 0 | 59578 | 0 | 59578 | 0 | 50412 | 0 | 46811 | 0 | 43691 | 0 | 40960 | 0 | 38551 | 0 | 36409 | 0 | 34493 | 0 | 32768 |

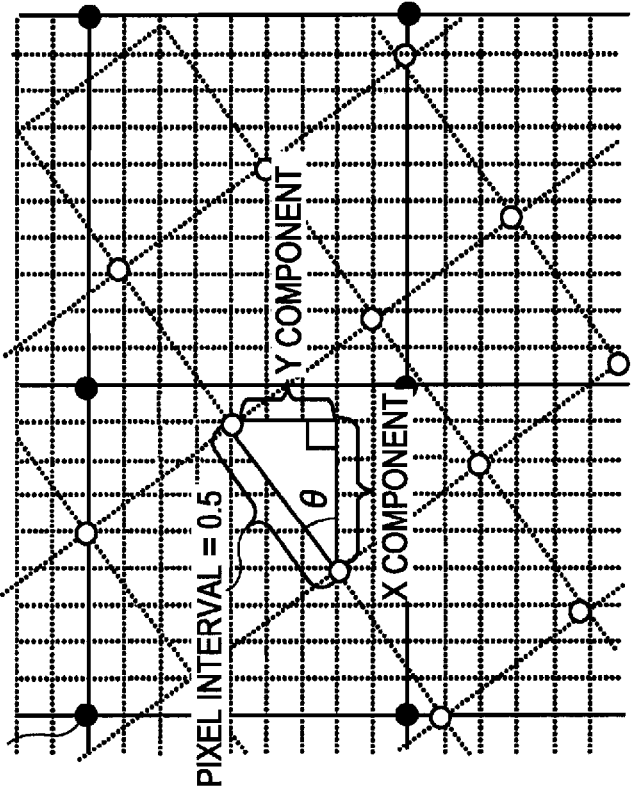
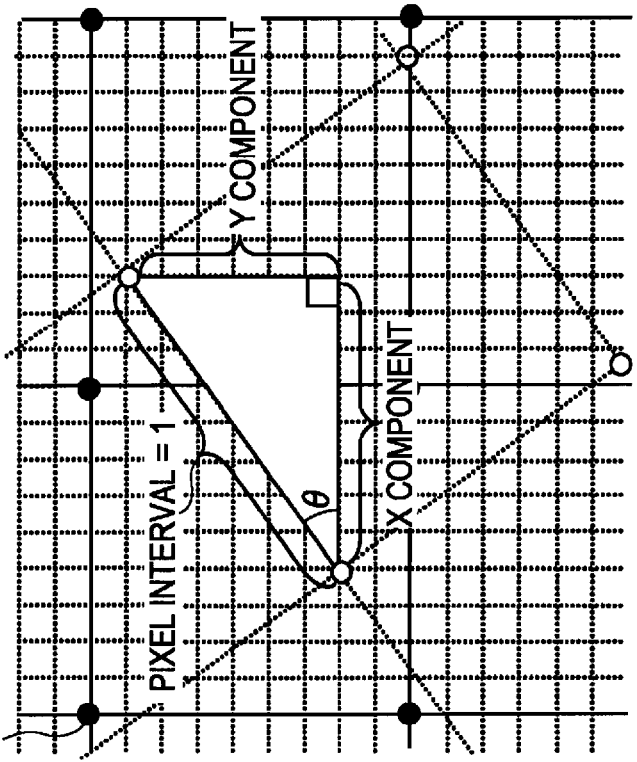
FIG. 13A — ENLARGEMENT FACTOR: 100%
FIG. 13B — ENLARGEMENT FACTOR: 200%

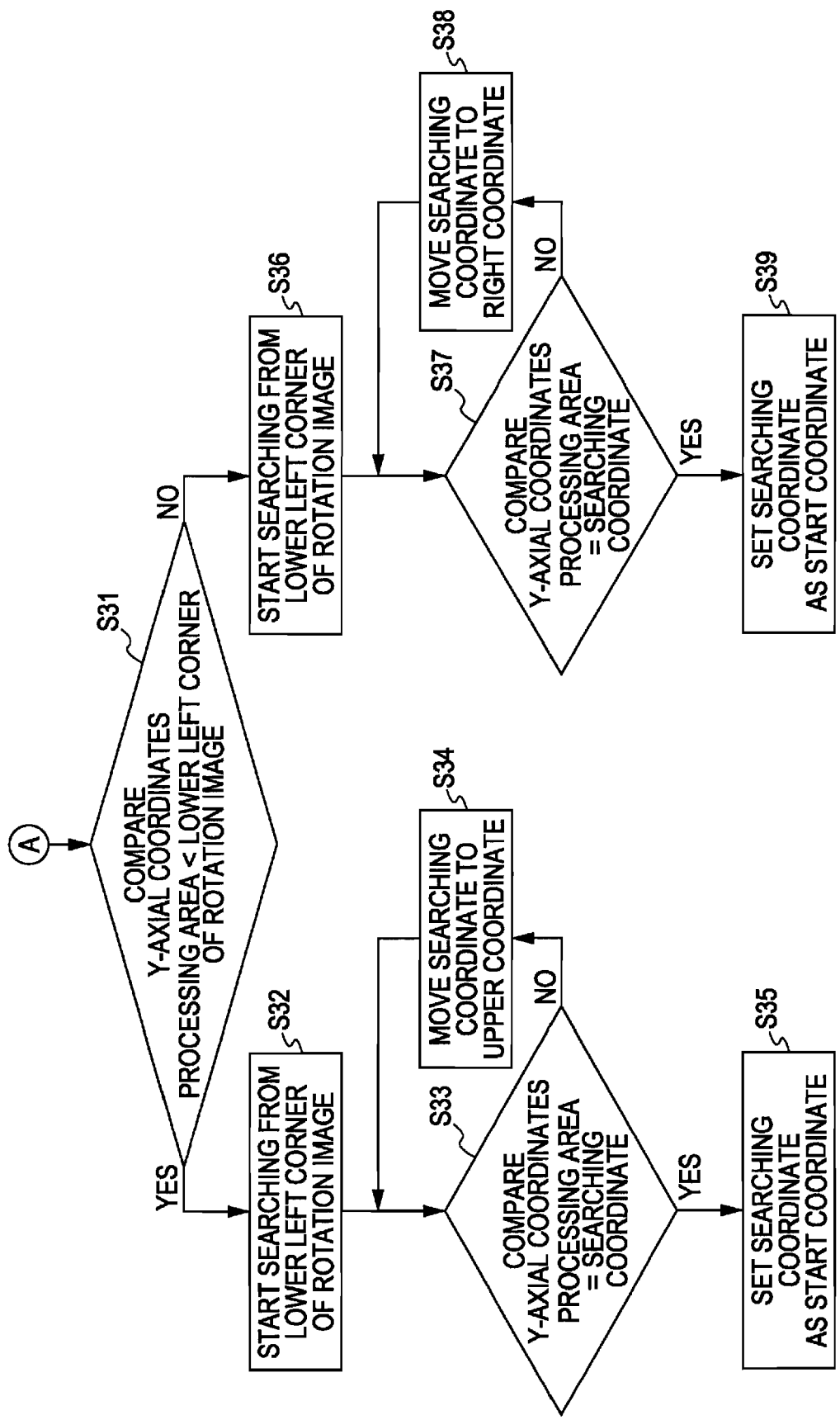

FIG. 22
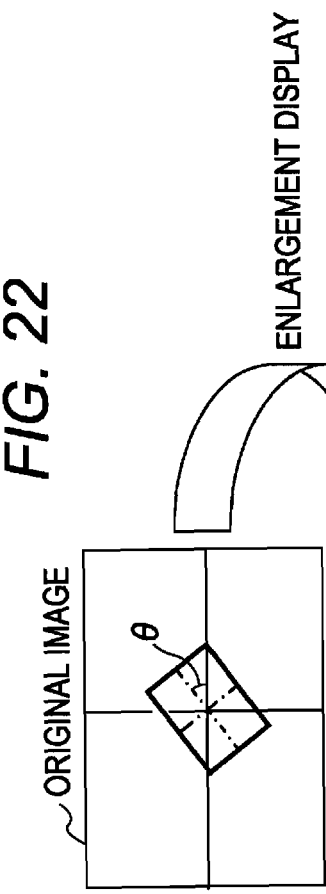
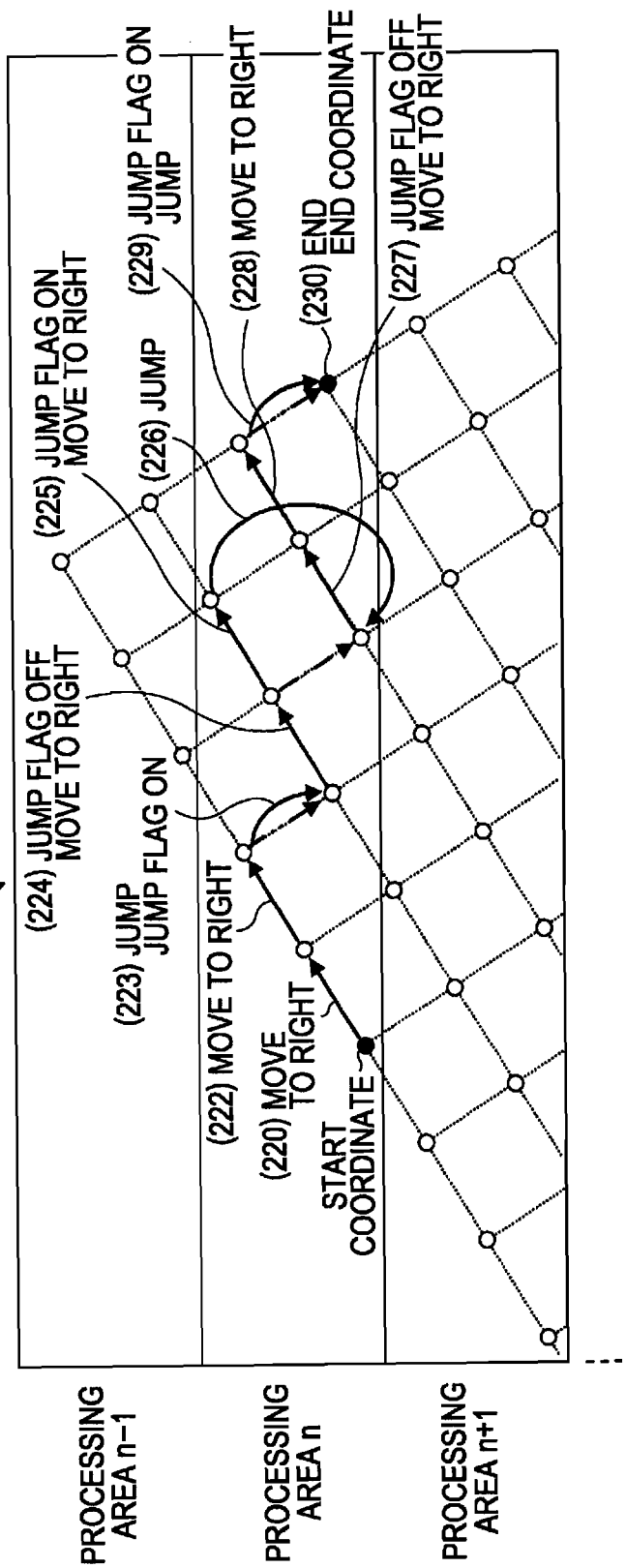

IMAGE RECOGNITION DEVICE AND IMAGE ROTATING METHOD

CROSS-REFERENCE TO RELATED APPLICATIONS

This application is related to and claims priority to Japanese patent application no. 2007-75496 filed on Mar. 22, 2007 in the Japan Patent Office, and incorporated by reference herein.

BACKGROUND

1. Field

The embodiments discussed herein are directed to an image recognition device which processes an image using computing hardware and/or software, and more specifically an image recognition device which rotates an input image at real time, including methods and computer readable media thereof.

2. Description of the Related Art

Most of image processes used for image recognition are currently executed by software, but some of functions are being implemented in computing hardware. This is because high-speed image process by parallel processing which is an advantage of hardware is required.

For example, Japanese Patent Application Laid-Open Nos. 11-252353, 6-333032, 2006-13803 and 10-222655 disclose a device in which some or all of functions are implemented in hardware and an image process such as rotation is executed on original images.

FIG. 1 is a diagram illustrating a method for the rotation process in a conventional image process. FIG. 1 illustrates an output rotation image 1 and an original image 2. In FIG. 1, the rotating process is executed in such a manner that a coordinate is calculated as to which coordinate on the original image 2 corresponds to each pixel of the output rotation image 1, and the coordinate data is referred to. When points to be a reference of the output image 1 are shown on the original image 2, a tilted rectangle 3 is displayed.

Details of the processing flow is as follows.

(100) Data about the original image 2 for one frame is stored in a memory.

(102) A rotting angle of the rotation image 1 to be output is determined before the process starts.

(103) The coordinates of pixels to be referred to are calculated as to which pixel of the original image 2 correspond to each pixel of the output rotation image 1.

The coordinates of the original image 2 to be referred to are obtained by the following calculating formula.

$$x = X \cos \theta + Y \sin \theta$$

$$y = -X \sin \theta + Y \cos \theta$$

θ: rotating angle, (x,y): the coordinate of the original image 2, (X,Y): the coordinate of the output image 1

(104) The pixel data of the coordinates to be referred to from the original image 2 are read from the memory. When pixels on which the calculated coordinates correspond to an intermediate value are not present, values of the pixels should be created by interpolation. For this reason, values of peripheral pixels are read.

(105) The data about the output rotation image 1 is output. A portion which requires interpolation is subject to the interpolation so as to be output.

(106) The processes (103) to (105) are successively executed on all the pixels of the output rotation image 1 so that data is created.

FIG. 2 illustrates the processing sequence of the output rotation image 1 in (106). As shown in FIG. 2, corresponding pixels on the original image 2 are obtained successively in an x right direction starting from a pixel on an upper left position of the output rotation image 1, and data about the output rotation image 1 is obtained from the data about the corresponding pixels.

In FIG. 2, the output rotation image 1 is obtained by rotating the original image 2 reversely through θ°. Therefore, when the corresponding pixels are obtained as shown in FIG. 2, the corresponding pixels are generated to an upper right direction (x+, y+) successively from a process start point of the original image 2.

A time chart of the processes (100) to (106) is shown in FIG. 3. In FIG. 3, when the original image 2 is input, it is stored in the memory ((100)). When the storage is completed, the rotating angle is determined before the image process starts ((102)), and a corresponding coordinate is calculated on the original image 2 based on the rotating angle ((103)). The corresponding coordinate data of the original image 2 is read from the calculated result ((104)), and this data is output as the data about the output rotation image 1 ((105)).

After the input of the original image 2 into the memory is completed, the processes (103) to (105) are executed successively on all the pixels of the output rotation image 1 (106).

When these image processes are executed by software, since the calculation is carried out on all the pixels of the output rotation image 1, a calculating amount is large, and an immense amount of time is required in a software process.

Therefore, when the processes are performed in hardware in order to increase the speed of the processes, it is necessary to once store the original image 2 for one frame, and thus a large memory is required. Further, since complicated calculating processes such as trigonometrical function and division process are included, a circuit size for the calculating process becomes huge.

SUMMARY

It is an aspect of the embodiments discussed herein to provide an image recognition device for generating an output rotation image from input original image data, including a memory section being capable of storing data of lines including pixels of the original image data to be processed and lines including pixels to be used for an interpolating process therein, an angle-to-sine/cosine converting section obtaining an X component and a Y component where a pixel interval of the original image data is an oblique side based on a rotating angle, a coordinate searching section calculating reference coordinates of the output rotation image for the original image using the X component and the Y component in order of inputting the original image data, an interpolating section executing an interpolating process when the reference coordinates are not present, and a rearranging section rearranging converted data acquired in the interpolating process so as to output data of the output rotation image.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 illustrates a constitutional example (1) of a conversion table provided to an angle-to-sine/cosine converter;

FIG. 10 illustrates a constitutional example (2) of the conversion table provided to the angle-to-sine/cosine converter;

FIG. 11 illustrates a constitutional example (3) of the conversion table provided to an angle-to-sine/cosine converter;

FIGS. 13A and 13B are explanatory diagrams of an enlarging process.

FIGS. 20A and 20B are flow charts illustrating details of the searching process of the start coordinate;

FIG. 22 illustrates an operation flow at the time of calculating the reference coordinate of the output rotation image for the original image.

DETAILED DESCRIPTION OF THE PREFERRED EMBODIMENTS

Figure 1:
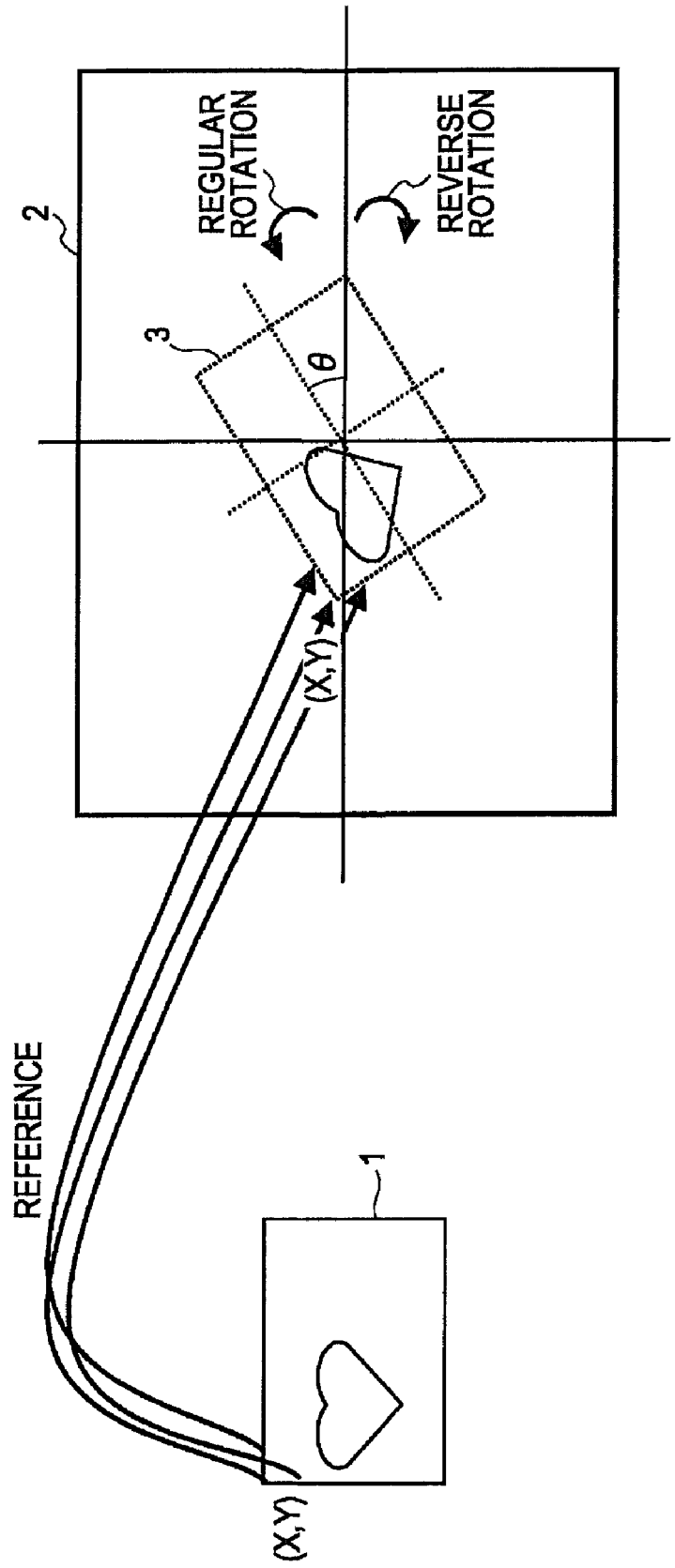
FIG. 1 illustrates a method for a rotating process in a conventional image process.
Figure 2:
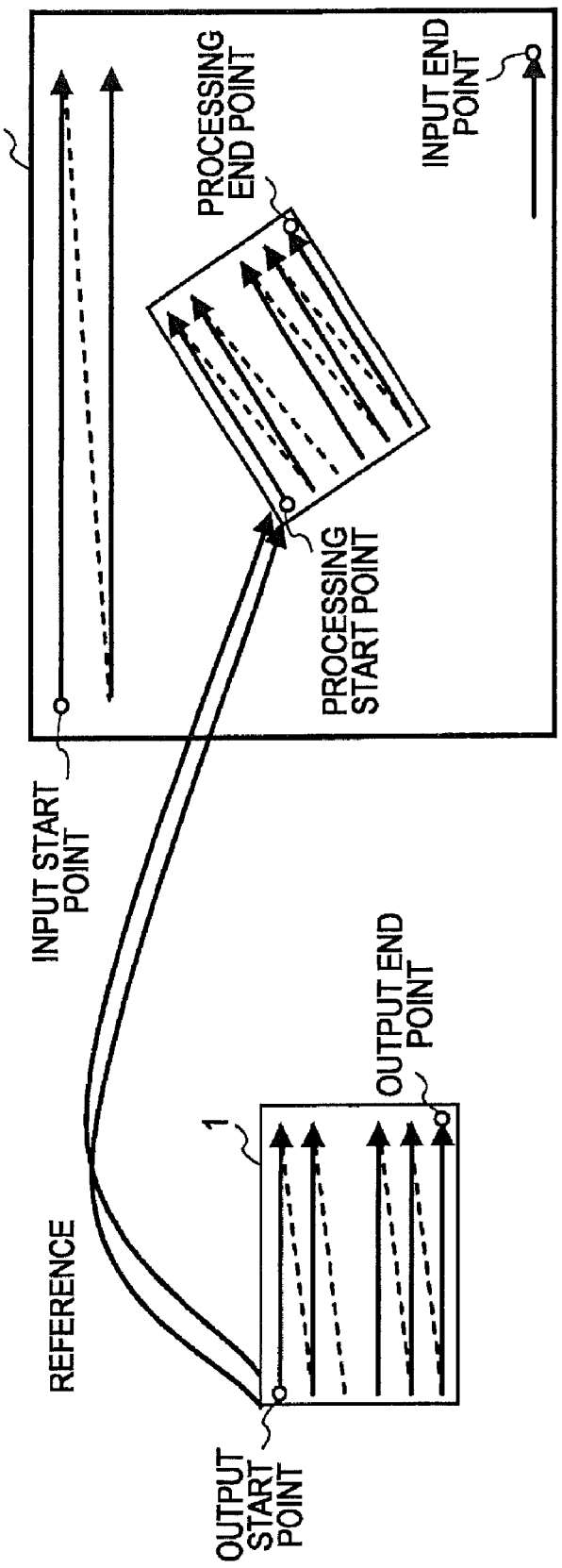
FIG. 2 illustrates a processing sequence of an output rotation image.
Figure 3:
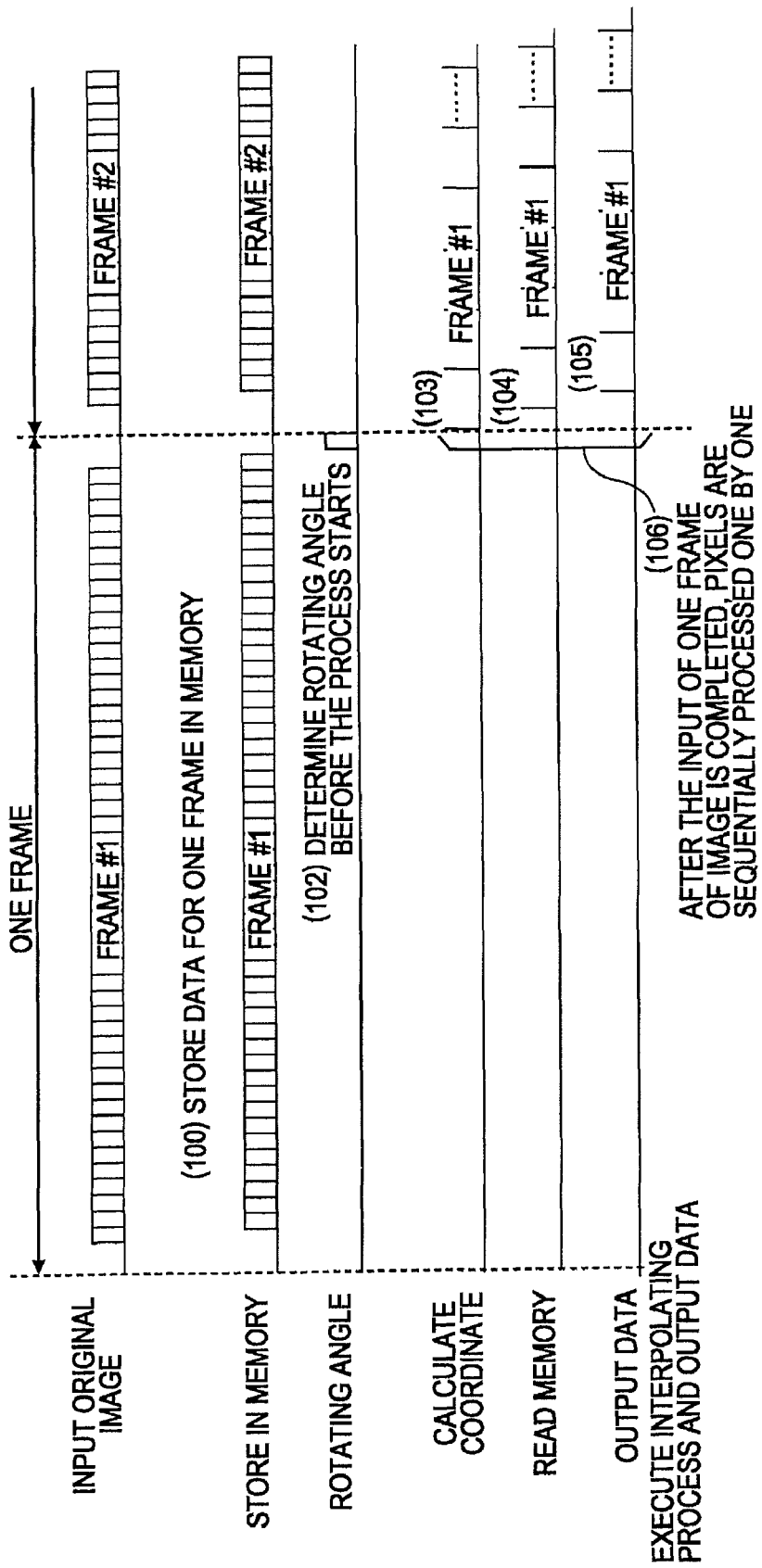
FIG. 3 is a time chart illustrating the method for the rotating process in the conventional image process.
Figure 4:
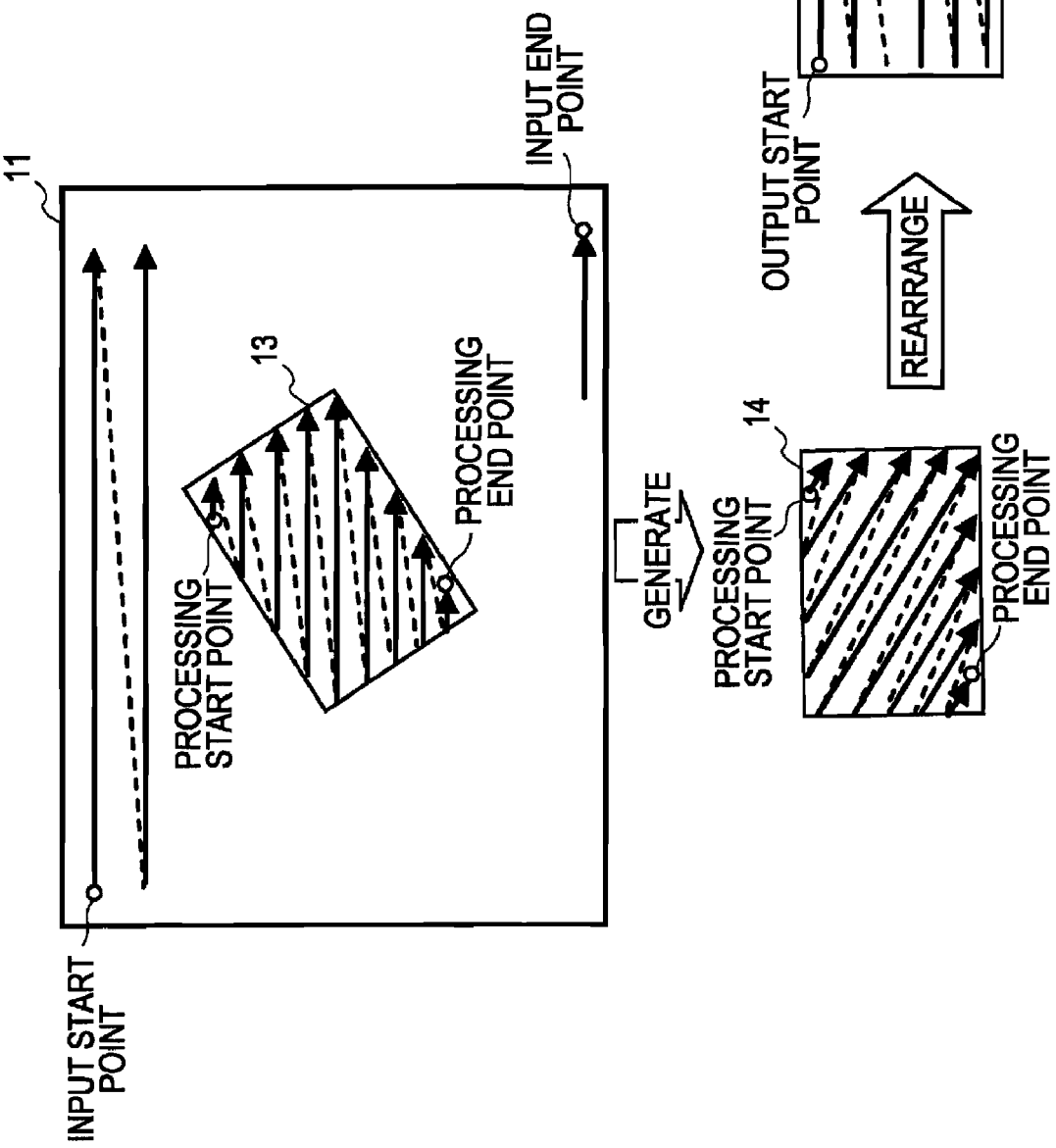
FIG. 4 illustrates an outline of the image rotating process in an image recognition device according to an embodiment.

An outline of an image rotating process in an image recognition device according to an embodiment is described. In the image recognition device according to the embodiment, as shown in FIG. 4, pixel data of an output rotation image 12 is created in order of inputting data of an original image 11. Their sequence is rearranged at the time of outputting the output rotation image 12. Therefore, as a memory which stores the data of the original image 11, a memory, which has a capacity, for example, for two lines including one line for pixels to be processed and one line for an interpolating process, may be provided, which can be substantially less than a memory capacity accommodating one image frame. However, the embodiments are not limited to such a two line memory capacity, and a memory capacity corresponding to any processing area range, for example, two or more lines of pixels as a processing are range, may be provided. In the embodiment, in the interpolating process, for example, a bilinear method for calculating four pixels around the pixel to be interpolated is used.

As shown in FIG. 4, the data of the original image 11 are input successively in a lateral direction (x direction), and when data of a range 13 to be processed is input, the data are processed in order of inputting so as to be stored as data 14 of the output rotation image. After all the image processes are ended, the data 14 of the output rotation image is rearranged at the time of outputting the output rotation image 12 so that an output start point comes to an upper left side and an output end point comes to a lower right side.

Since it is not necessary to once store an original image for one frame in a memory unlike a conventional technique, the capacity of the memory for storing an original image can be reduced by this process.

When a portion to be interpolated at the time of creating the output rotation image 12 is thickened, the rotating process and an image enlarging process can be simultaneously executed. A size of the range 13 to be processed is determined in advance.

Figure 5:
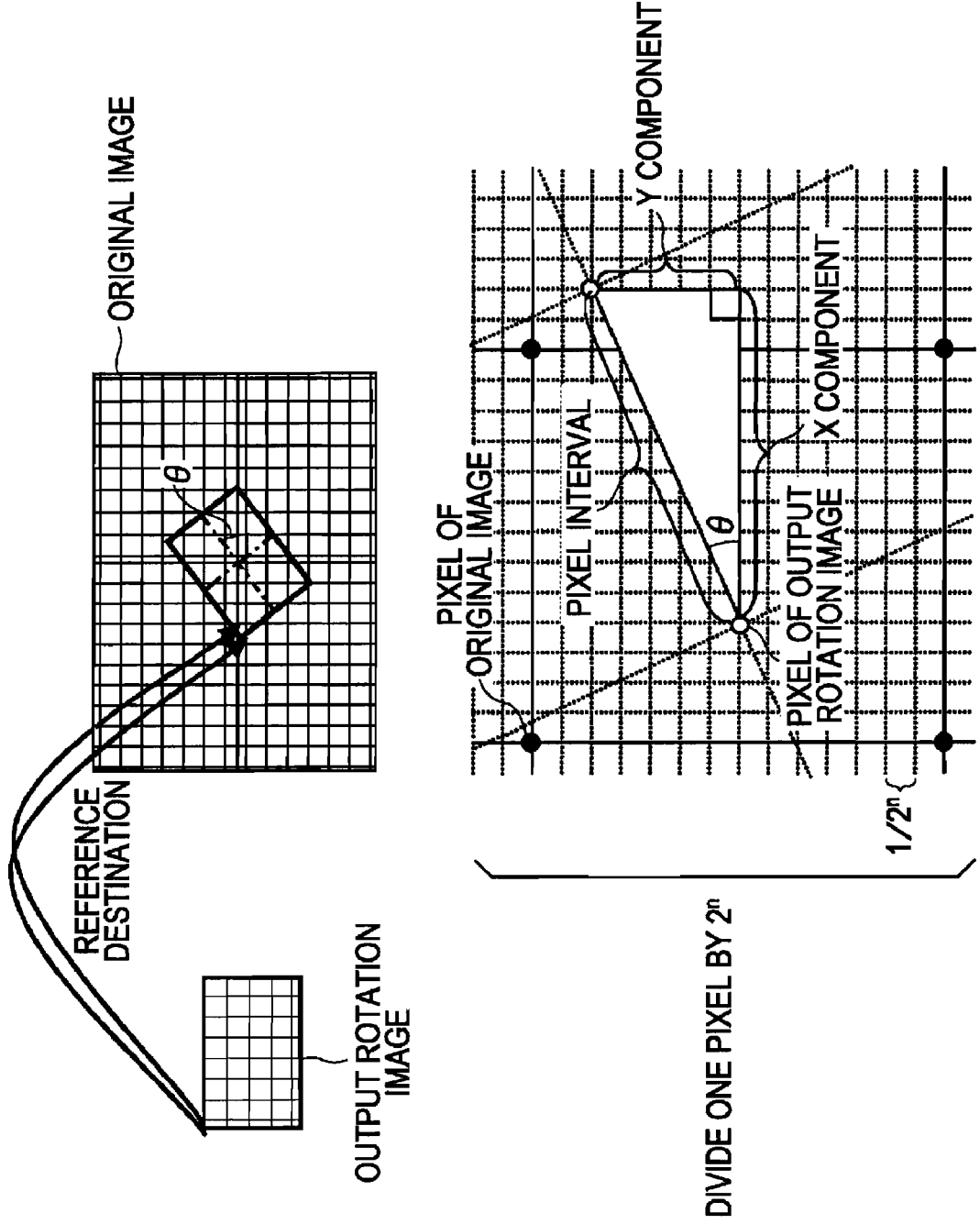
FIG. 5 illustrates a method for specifying a tilt of the output rotation image in the image recognition device according to the embodiment.

In the image recognition device of the embodiment, a tilt of the rotation to be used for the image process is specified by using not an angle but an X-axial component (cosine) and a Y-axial component (sine) where a pixel interval of the output rotation image is an oblique (inclined) line, for example, an oblique side of a triangle as shown in FIG. 5.

The angle is converted into sine and cosine by using, for example, a conversion table. As a result, a size of a computing unit to be used for calculation can be reduced. The values of sine and cosine are expressed by a binary fixed decimal point, and n-digit decimal parts are prepared. The calculation is made with the pixel interval of the original image being 1. A coordinate of the original image to be referred to is also expressed by a binary fixed decimal point having n-digit decimal part. As a result, the interval of one pixel can be expressed by ½n interval.

Figure 6:
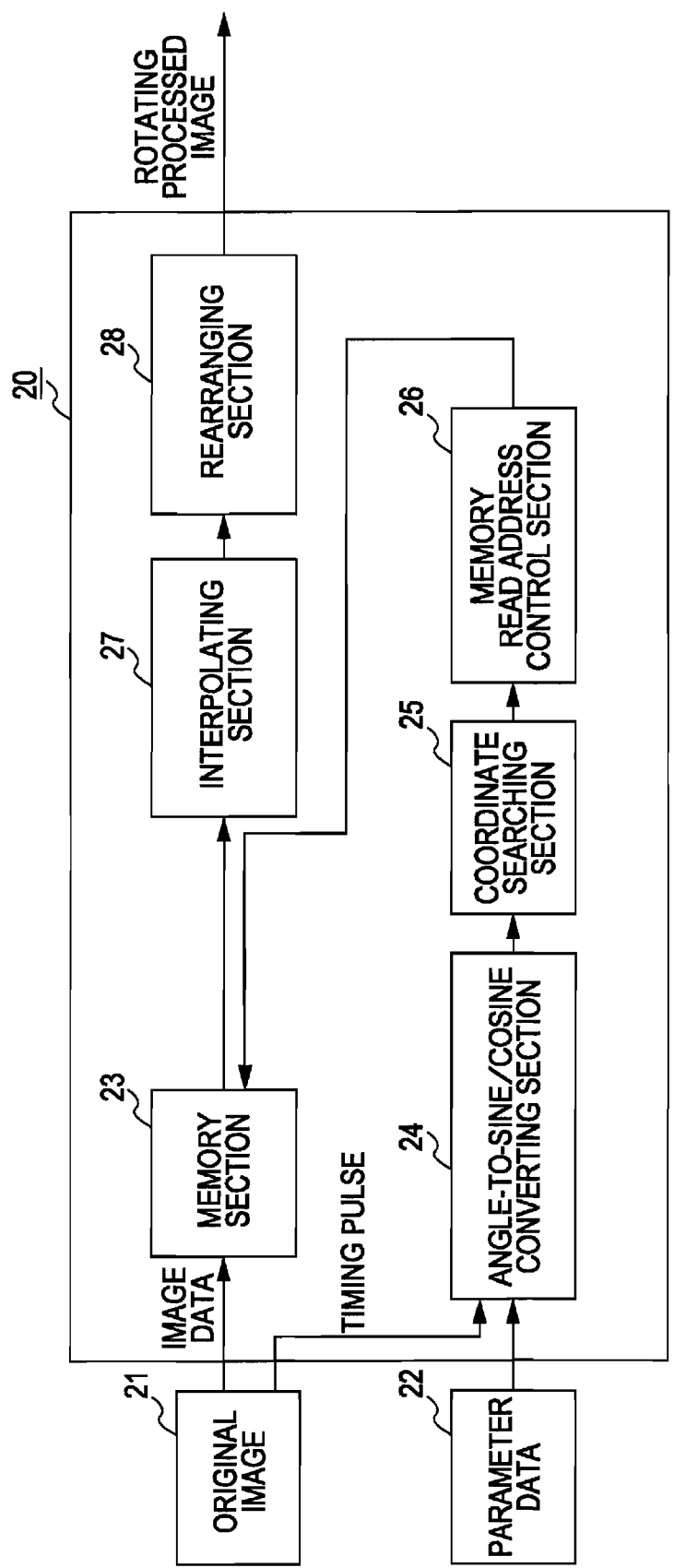
FIG. 6 illustrates a constitutional example of the image recognition device according to the embodiment.

A constitution of the image recognition device in the embodiment is described below. FIG. 6 is a diagram illustrating a constitutional example of the image recognition device according to the embodiment. Original image data 21 and parameter data 22 are input into the image recognition device 20 in FIG. 6. The image recognition device 20 has a memory section 23, an angle-to-sine/cosine converting section 24, a coordinate searching section 25, a memory read address control section 26, an interpolating section 27 and an rearranging section 28.

The original image data 21 is composed of a timing pulse showing a head of a frame and image data. The parameter data 22 is data showing the rotating angle, a center position and an enlargement factor.

The memory section 23 is an image buffer memory having a capacity for enabling an original image for two lines to be saved. The angle-to-sine/cosine converting section 24 converts the rotating angle given as the parameter data 22 into data of an X-axial component (cosine) and a Y-axial component (sine) using a conversion table provided to the angle-to-sin/cosine converting section 24. The coordinate searching section 25 calculates a reference coordinate of the output rotation image for the original image using the X-axial component and the Y-axial component. The memory read address control section 26 generates addresses of four pixels around a coordinate to be referred to be used for the interpolating process in the memory section 23. The interpolating section 27 generates data of the coordinate to be referred to according to the interpolating process. The rearranging section 28 rearranges converted data obtained at the interpolating process at the time of outputting them.

Figure 7:
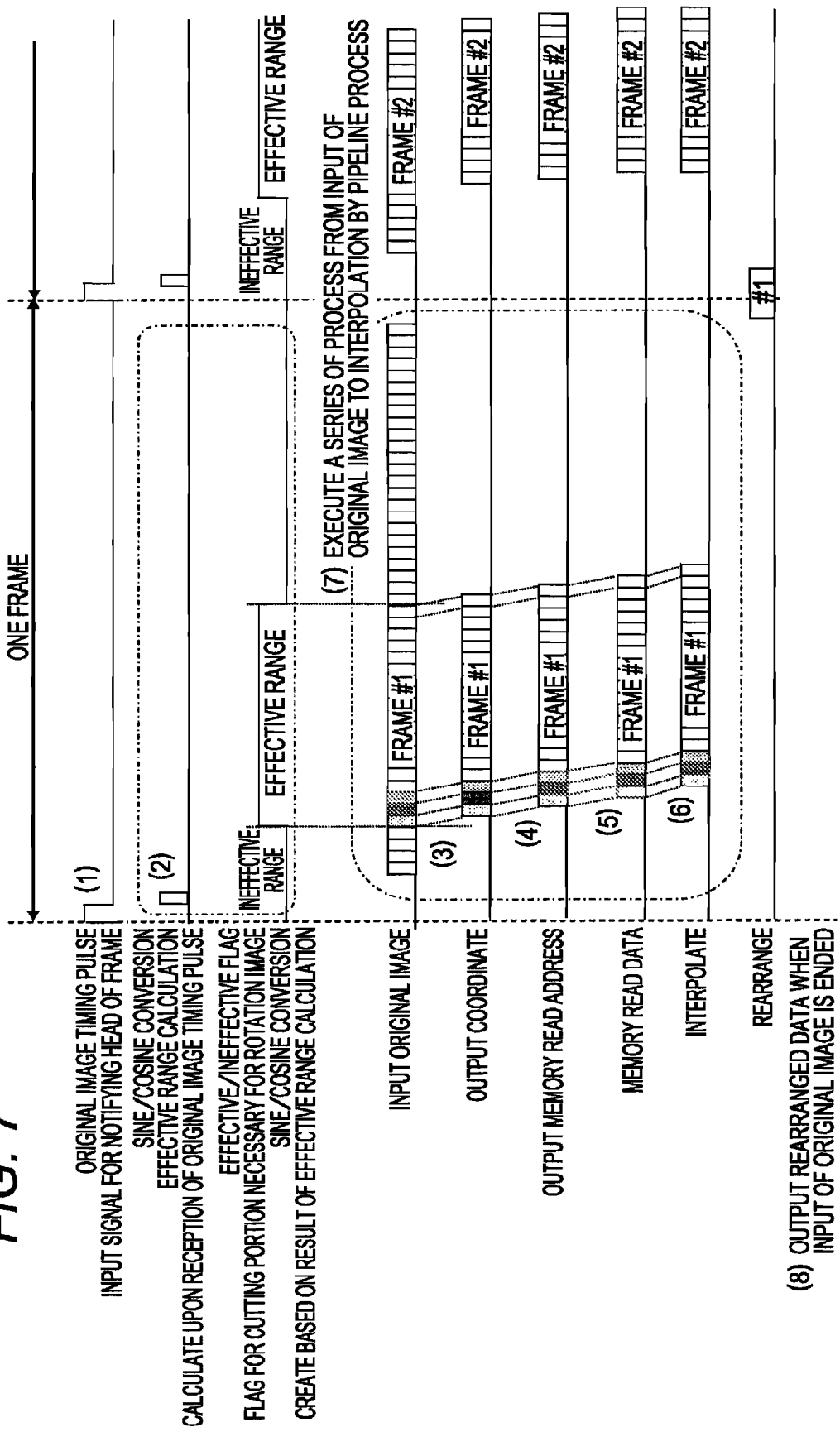
FIG. 7 is a time chart illustrating the processing procedure by the image recognition device according to the embodiment.

The image recognition device 20 processes the original image data 21 on a processing area by processing area per frame. FIG. 7 is a time chart illustrating a procedure of this process. The following parenthetical process sequence numbers (1) to (8) correspond to the parenthetical process sequence numbers in FIG. 7.

(1) A timing pulse showing a head of a frame is received from the input original image data 21.

(2) Upon reception of the timing pulse of the original image in (1), the conversion table is referred to in the angle-to-sine/cosine converting section 24. As a result, the rotating angle and the enlargement factor in the parameter data 22 are converted into the X-axial component (cosine) and the Y-axial component (sine) of the pixel interval in the output rotation image, and the processing effective range is calculated so that an effective range flag is set.

(3) A coordinate to be referred to is calculated in the coordinate searching section 25.

(4) The memory read address control section 26 generates read addresses of four pixels around the coordinate to be referred to.

(5) Data values of the four pixels obtained at (3) are read from the memory section 23.

(6) The interpolating section 27 calculates a value of one pixel from the four pixels using the bilinear method.

(7) The processes (3) to (6) are executed by a pipeline process according to the input of the image data of the original image. This process is executed on all the effective range of the image.

(8) When the data creation for one frame is ended, the rearranging section 8 executes a rearranging process, and outputs a rotated image.

Figure 8:
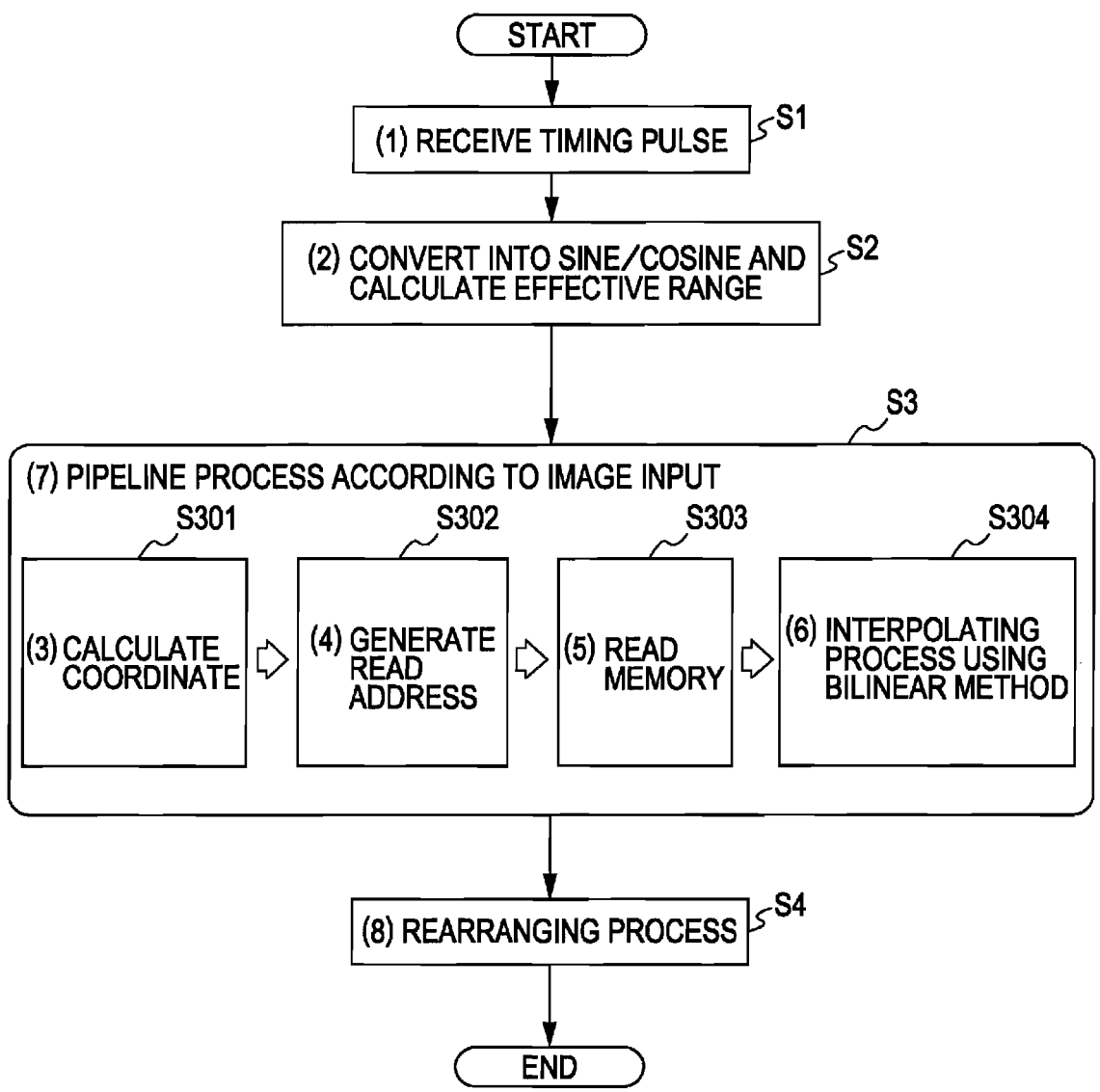
FIG. 8 is a flow chart illustrating the processing procedure by the image recognition device according to the embodiment.

The above process is expressed by a flow chart in FIG. 8. The process sequence numbers (1) to (8) in FIG. 8 correspond to the process sequence numbers in FIG. 7. When the process in FIG. 8 is started, the timing pulse showing the head of the frame is received from the input original image data 21 at S1.

Upon reception of the timing pulse of the image at S1, the angle-to-sine/cosine converting section 24 converts the rotating angle in the parameter data 22 into the X-axial component (cosine) and the Y-axial component (sine) of the pixel interval of the output rotation image using the conversion table at S2. The angle-to-sine/cosine converting section 24 calculates the effective range.

The coordinate to be referred to is calculated at S3 (S301). Read addresses of four pixels around the coordinate to be referred to in the memory section 23 are generated at S3 (S302). The data values of the four pixels are read at S3 (S303). Four processes in the interpolating process (S304) according to the bilinear method are executed in a pipeline manner according to the input of the image at S3. When the creation of data for one frame is ended, the data are rearranged so as to be output at S4.

FIGS. 9 to 11 are diagrams illustrating constitutional examples of the conversion table owned (accessed or stored) by the angle-to-sine/cosine converting section 24. This conversion tables are examples where the pixel interval of the image is expressed by 65536 resolutions (16 bit). When the conversion tables of FIGS. 9 to 11 are referred to as to the rotating angle (°) and the enlargement factor (%), they can be converted into the X-axial component (cosine) and the Y-axial component (sine).

The angle-to-sine/cosine converting section 24 does not carry out sin and cos calculations but converts the rotating angle and the enlargement factor into the X-axial component and the Y-axial component using the conversion tables. As a result, the circuit size can be reduced, and the converting speed can be increased.

Figure 12A:
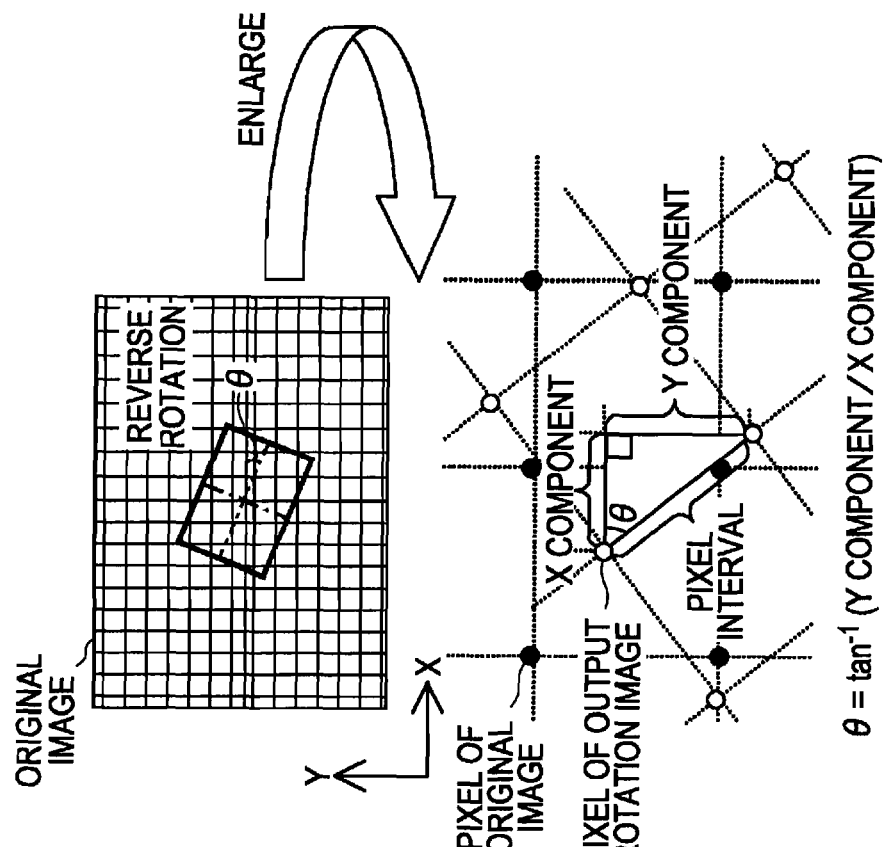
FIGS. 12A and 12B illustrate a method for expressing a tilt of rotation in a coordinate searching section.
Figure 12B:
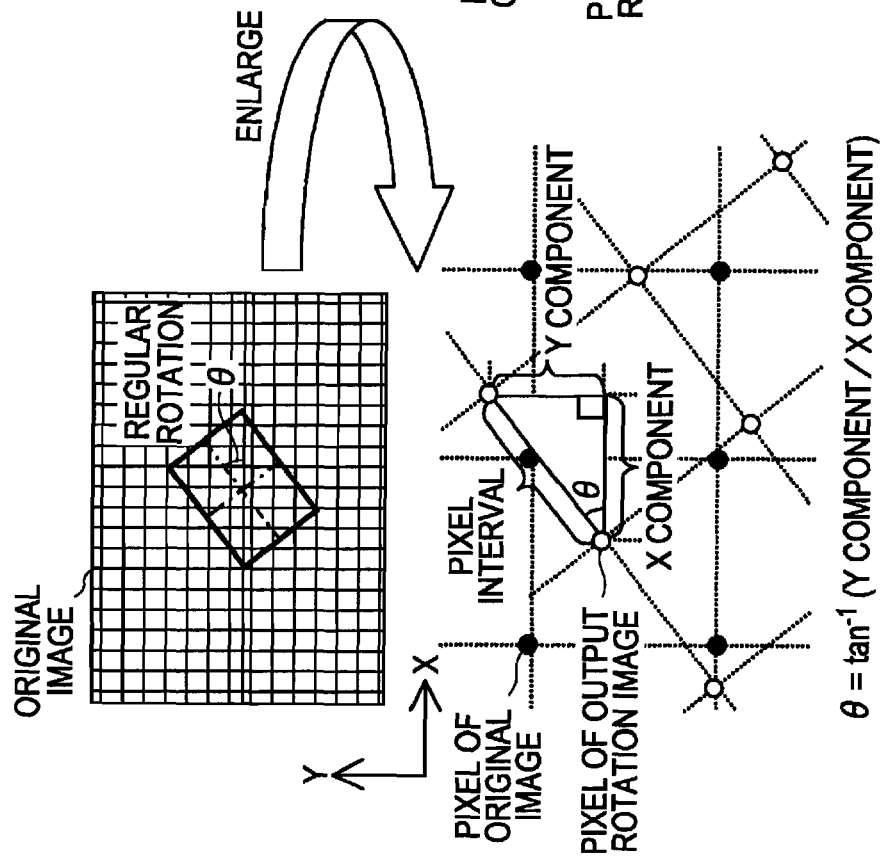

FIGS. 12A and 12B are diagrams illustrating a method for expressing a tilt of the rotation in the coordinate searching section 25. FIG. 12A illustrates the rotation tilt expressing method in the case of regular rotation, and FIG. 12B illustrates the method in the case of reverse rotation. "•" in the drawings shows pixels of the original image, and "○" shows pixels of the output rotation image. In order to simplify the description, FIGS. 12A and 12B illustrate the case where the enlargement factor is 100%.

The coordinate searching section 25 specifies the tilt of the rotation by using not an angle but the X-axial component (cosine) and the Y-axial component (sine) where the pixel interval of the output rotation image is an oblique side.

As to the X-axial component and the Y-axial component, the pixel interval of the original image (X-axial direction and Y-axial direction) is 1. The X-axial component and the Y-axial component are expressed by binary fixed decimal point, and n-digit decimal part is prepared. In this expressing method, the rotation through ±90° is supported, and the X-axial component does not have symbol information. In the case of the regular rotation (0 to 90°) shown in FIG. 12A, the Y-axial component is expressed by a positive number. In the case of the reverse rotation (0 to −90°) shown in FIG. 12B, the Y-axial component is expressed by a negative number.

The method for calculating the X-axial component (cosine) and the Y-axial component (sine) of the output rotation image is as described below.

$$X\text{-axial component} = \text{pixel interval (in the case 1 of the enlargement factor 100\%)} \times \cos\theta$$

$$Y\text{-axial component} = \text{pixel interval (in the case 1 of the enlargement factor 100\%)} \times \sin\theta$$

FIGS. 13A and 13B are explanatory diagrams illustrating the enlarging process. FIG. 13A illustrates the enlarging process in the case where the enlargement factor is 100%. FIG. 13B illustrates the enlarging process in the case where the enlargement factor is 200%. "•" in the drawings shows the pixels of the original image, and "○" shows the pixels of the output rotation image.

When the pixel interval of the output rotation image is reduced to half of the pixel interval of the original image, the pixel generated from the same area of the original image is doubled, and the output rotation image is enlarged two times. When FIG. 13A is compared with FIG. 13B, the pixel interval of the output rotation image in FIG. 13A is 1, but the pixel interval of the output rotation image in FIG. 13B is 0.5, and thus the output rotation image in FIG. 13B is 200% of the output rotation image in FIG. 13A. The enlarging process is executed by using this principle.

The X component and the Y component which are the same as the rotation are used for specifying the enlargement. When the pixel interval is 1, the size of the output rotation image is 100% with respect to the original image. Since the size of the output rotation image is determined in inverse proportion to a length of the pixel interval, the calculating formula for the X-axial component and the Y-axial component of the output rotation image described in FIGS. 12A and 12B is expressed as follows.

X-axial component=100/enlargement factor (%)×cos θ

Y-axial component=100/enlargement factor (%)×sin θ

In the above calculation and the calculation in FIGS. 12A and 12B, the conversion tables in FIGS. 9 to 11, where the inputs are the enlargement factor and the rotating angle θ and the outputs are X-axial component and the Y-axial component, is used. As a result, the calculation of trigonometrical function is omitted.

Figure 14:
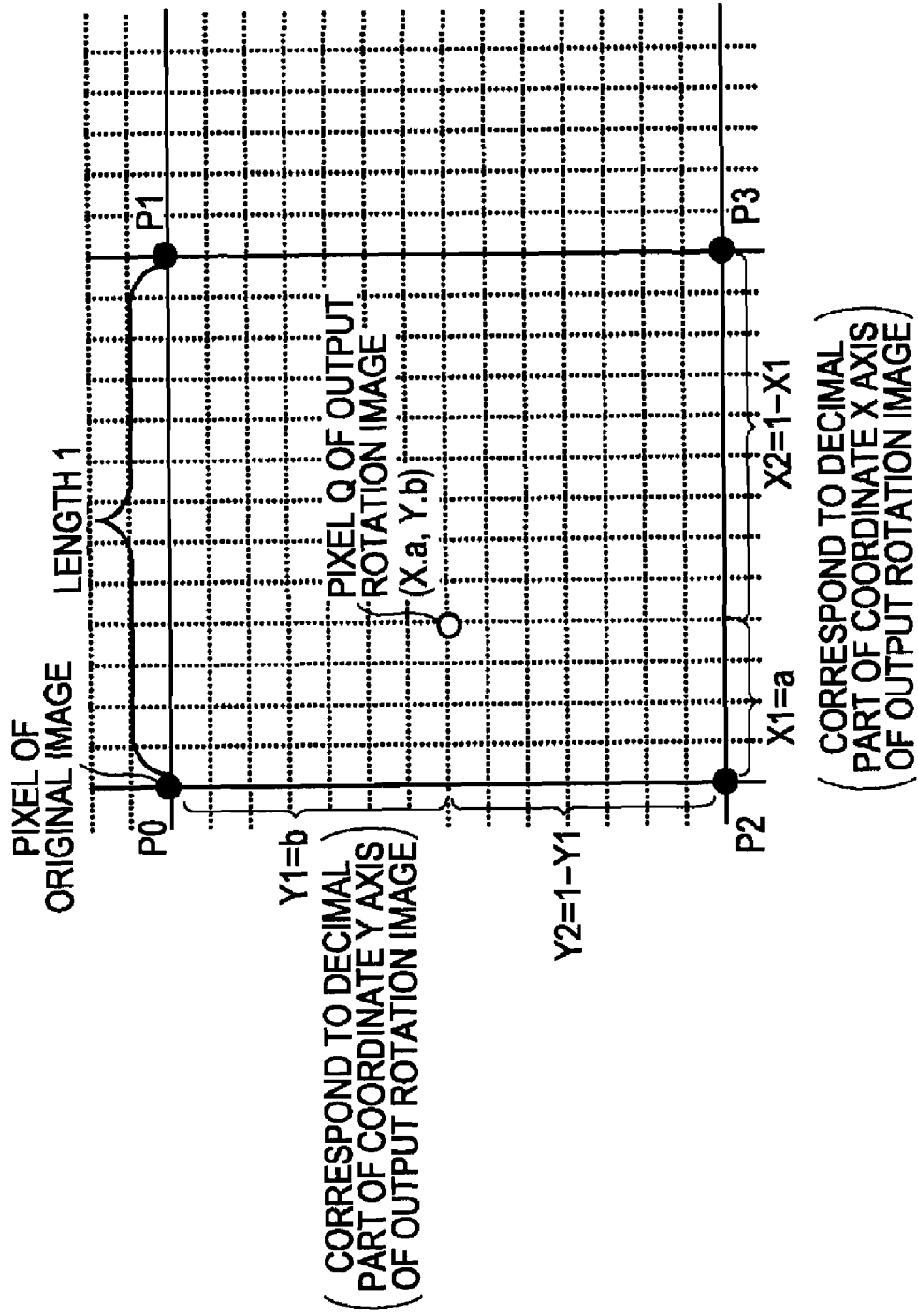
FIG. 14 illustrates an interpolating process executed in an interpolating section.

FIG. 14 is a diagram describing the interpolating process executed in the interpolating section 27. In the image recognition device of the embodiment, in order to generate the output rotation image, the original image is interpolated so that a pixel value is calculated. In the interpolating process, a bilinear method for executing linear interpolation using peripheral four pixels of the original image is used. The bilinear method is an interpolating process for multiplying pixel data by factors weighted according to distances so as to add the pixel data. The weighting factors become larger for the closer pixels. The distances of the four points are obtained by using the decimal parts of the coordinates.

In FIG. 14, the value Q of the pixel (X.a, Y.b) (a, b is decimal part) of the output rotation image is obtained according to the formula $$Q=P_0W_0+P_1W_1+P_2W_2+P_3W_3.$$

Here, $P_i$ (i=0 to 3) represents the value of the pixel $P_i$, and $W_i$ (i=0 to 3) represents the weighting factor of the pixel $P_i$.

A horizontal distance X1 between the target pixel Q and the pixel P0 becomes "a," and a vertical distance Y1 between the pixel Q and the pixel P0 becomes "b" in FIG. 14. Since the distance between pixels is 1, a horizontal distance X2 between the target pixel Q and the pixel $P_3$ becomes 1–X1, and a vertical distance Y2 between the pixel Q and the pixel $P_3$ becomes 1–Y1.

In this example, the weighting factor $W_i$ (i=0 to 3) is determined by using the above distances, and the respective weighting factors are obtained by formulas: W0=(1–a)×(1–b), W1=a×(1–b), W2=(1–a)×b, and W3=a×b. Here, "a" represents the decimal part of the X axis of the output rotation coordinate Q, and "b" represents the decimal part of the Y axis of the output rotation coordinate Q.

Figure 15:
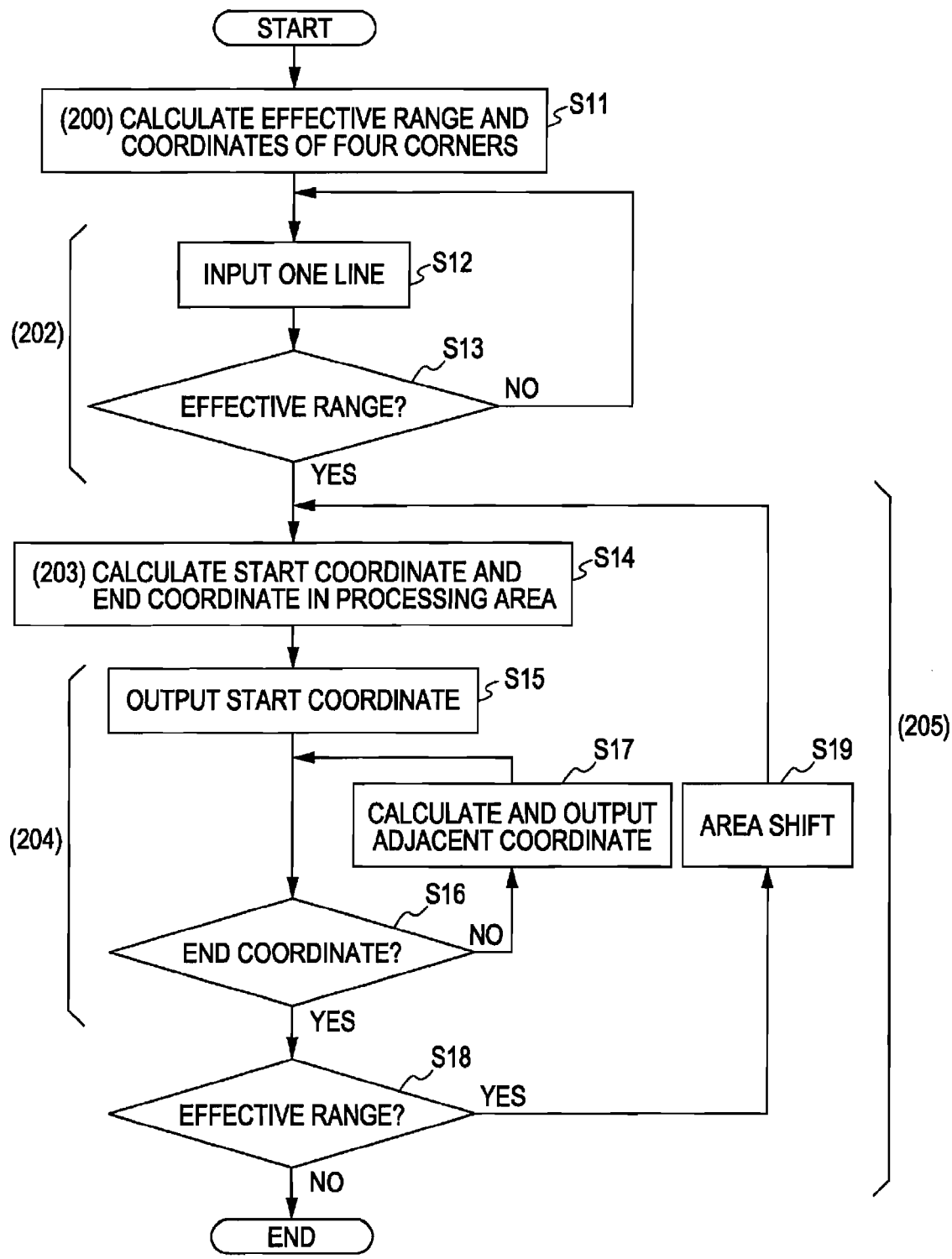
FIG. 15 is a flow chart illustrating a process for calculating a reference coordinate of the output rotation image on a processing area-by-processing area basis for an original image per frame.

FIG. 15 is a flow chart illustrating the process for calculating a reference coordinate of the output rotation image on a processing area-by-processing area basis for the original image per frame. This process is executed in the coordinate searching section 25. The coordinate is output in synchronization with the input of the original image 21 so that the original image 21 can be read in order of input. The effective range as a range subject to a coordinate calculating process, mentioned later, is calculated, and each area which is sandwiched between data for two lines in the memory (hereinafter, called as a processing area) within the effective range is processed.

When the process in FIG. 15 is started, the effective range for the rotation image calculation and coordinates of four corners of a rectangle are calculated at the head of a frame at S11.

Data for one line of the original image data is input into the memory section 23 at S12. A determination is made at S13 whether the data for one line input at S2 is within the effective range. As a result of the determination, when the data is not within the effective range (NO at S13), the process returns to S12 and data for next one line is input into the memory section 23.

When the data for one line input into the memory section 23 is within the effective range at S13 (YES at S13), a coordinate of a pixel where the process in the processing area is started and a coordinate of a pixel where the process is ended are calculated at S14. Details of this process are mentioned later.

The coordinate of the pixel where the process is started obtained at S14 is output as the coordinate of the pixel to be processed from the coordinate searching section 25 at S15.

A determination is made at S16 whether the coordinate of the pixel to be processed is the coordinate of the pixel where the process is ended obtained at S14. When the coordinate is not the end coordinate (NO at S6), a coordinate of a pixel next to the pixel to be processed is output at S17, and the process returns to S16.

When the end coordinate is output and the coordinate to be processed is the end coordinate at S16 (YES at S16), a determination is made at S18 whether next input one line is within the effective range. When the one line is within the effective range (YES at S18), the one line is input into the memory section 23 at S19 and the process moves to a next processing area (area shift). When the next input one line is not within the effective range at S18, the process on all the lines within the effective range is completed, and thus this process is ended.

Figure 16:
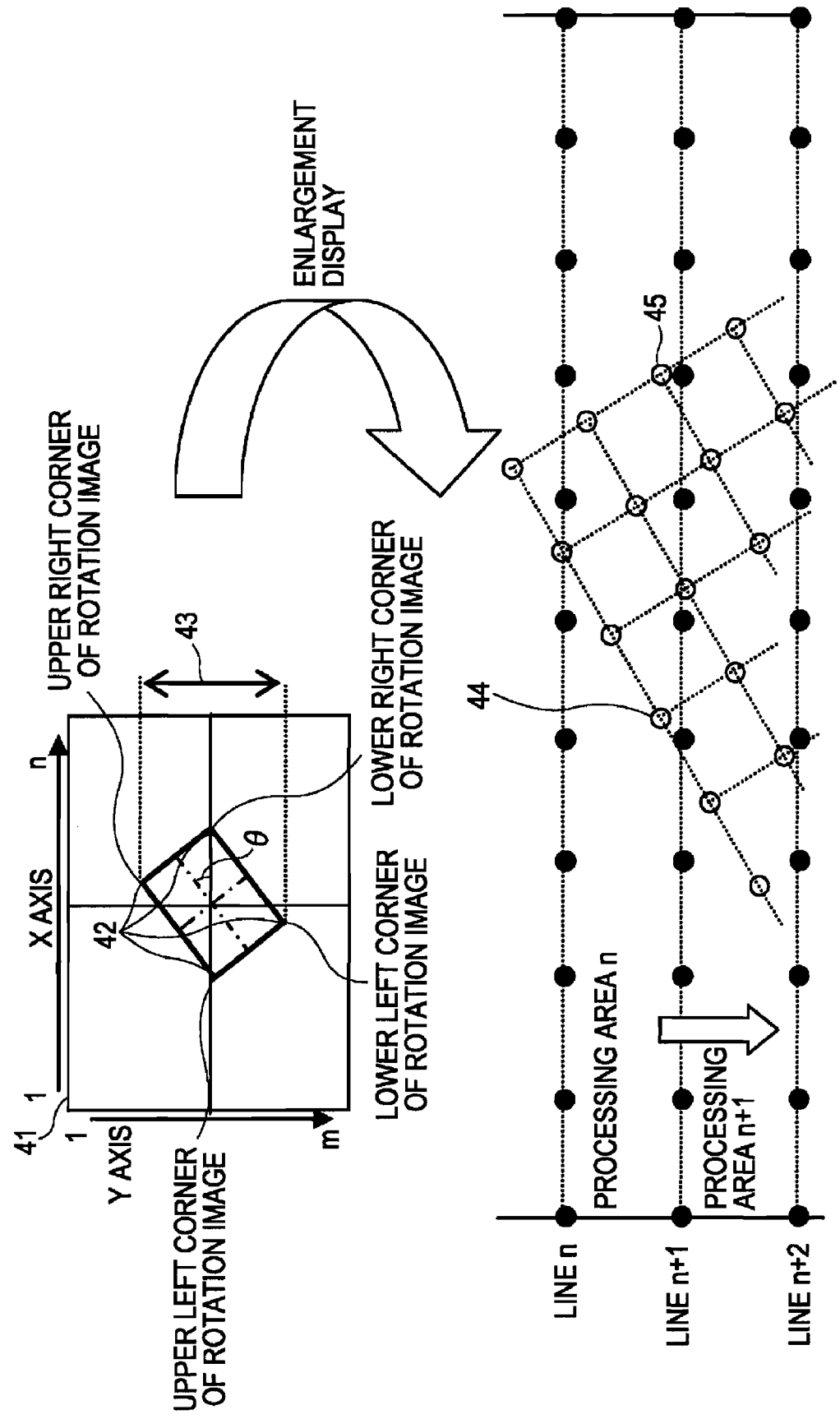
FIG. 16 illustrates four corners, an effective range and a processing area.

FIG. 16 is an explanatory diagram illustrating the four corners, the effective range and the processing area described in the flow chart of FIG. 15. The four corners shown in FIG. 16 refers to the four corners 42 of the rectangle of the output rotation image in the original image. 41, the rectangular range surrounded by these four corners 42 is the output rotation image.

The effective range 43 refers to a range between the top corner (the value Y is the smallest) and the bottom corner (the value Y is the largest) of the four corners 42. The lines of the original image 41 within the effective range 43 are subject of the coordinate calculating process.

The processing area refers to an area where the coordinates of the pixels to be output are searched, namely, a range between two lines. For example, the processing area n refers to a range between line n and line n+1, and the processing area n+1 refers to a range between line n+1 and line n+2. The line shift refers to moving of the process to the next processing area, and for example, the process is moved from the processing area n to the processing area n+1. The processing area is a range stored in the memory section 23 in the original data.

The start coordinate obtained at S14 refers to a coordinate of a pixel of the output rotation image on the leftmost side in the processing area (the value X is the smallest). The end coordinate refers to a coordinate of a pixel of the output rotation image on the rightmost side in the processing area (the value X is the largest). For example, in the processing area n, a pixel 44 is the pixel of the start coordinate, and a pixel 45 is the pixel of the end coordinate.

Figure 17:
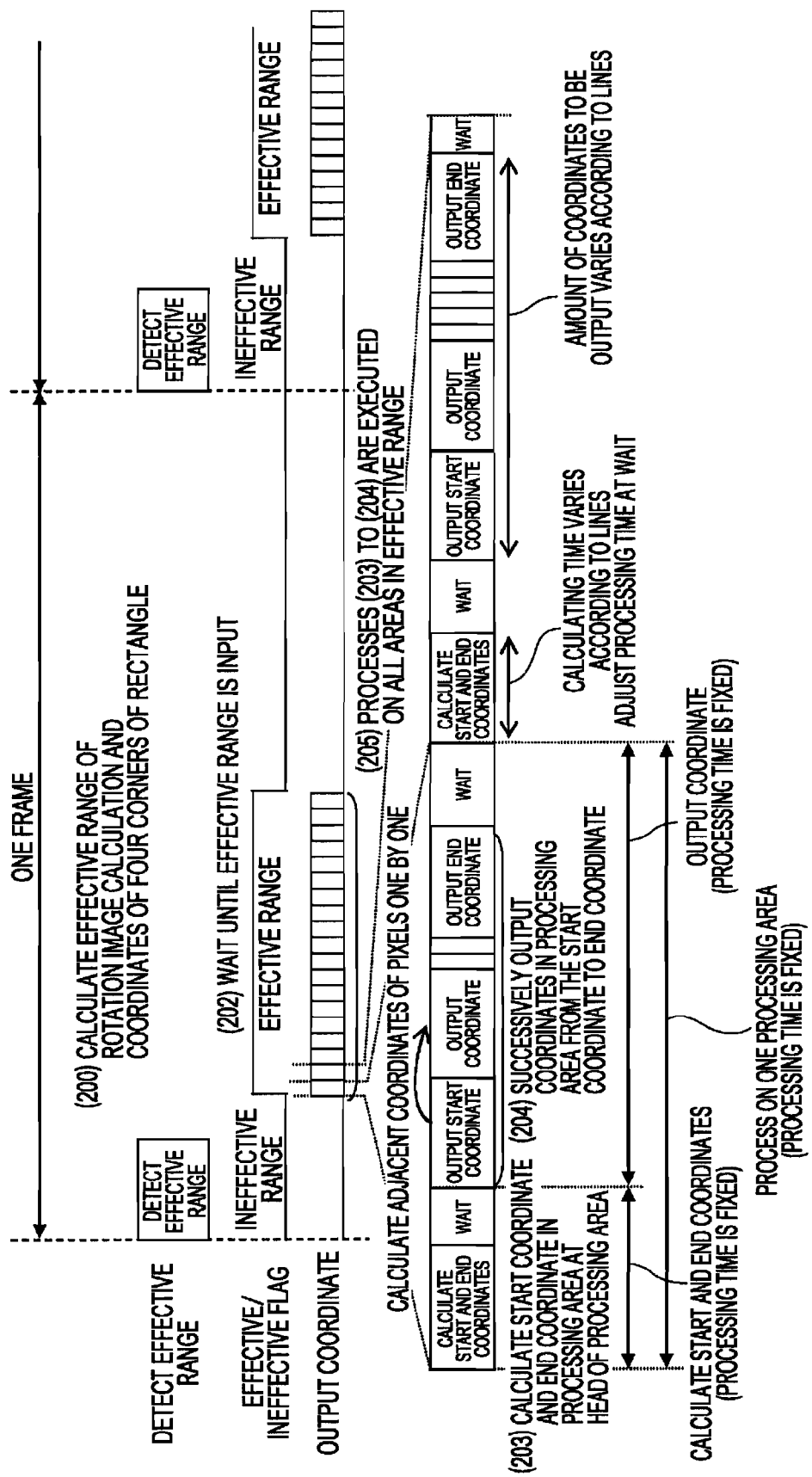
FIG. 17 is a time chart illustrating an operation for calculating a reference coordinate of the output rotation image for the original image.

FIG. 17 is a time chart illustrating an operation for calculating a reference coordinate of the output rotation image for the original image shown as the flow chart in FIG. 15. The process sequence numbers ((200) to (205)) showing the processing sequences in FIG. 17 correspond to the parenthetical process sequence numbers in FIG. 15. In FIG. 17, the coordinate searching section 25 searches and outputs coordinates of pixels composing the output rotation image according to the following flow.

(200) The coordinates of the four corners of the rectangle and the effective range to be subject to the coordinate calculating process are calculated at the head of the frame.

(202) The sequence waits until original image data corresponding to the effective range is input.

(203) The start coordinate and the end coordinate in the processing area are calculated at the head of the processing area.

(204) Coordinates in the processing area from the start coordinate to the end coordinate are successively output.

(205) The process from (20) to (4) is executed on all the processing areas within the effective range.

This flow is executed every time when a frame of original image data is input. In the process of FIG. 17, wait time can be provided after (203) the calculation of the start coordinate and the end coordinate and/or (204) the output of the end coordinate so that the time required for processing one processing area becomes constant.

Figure 18:
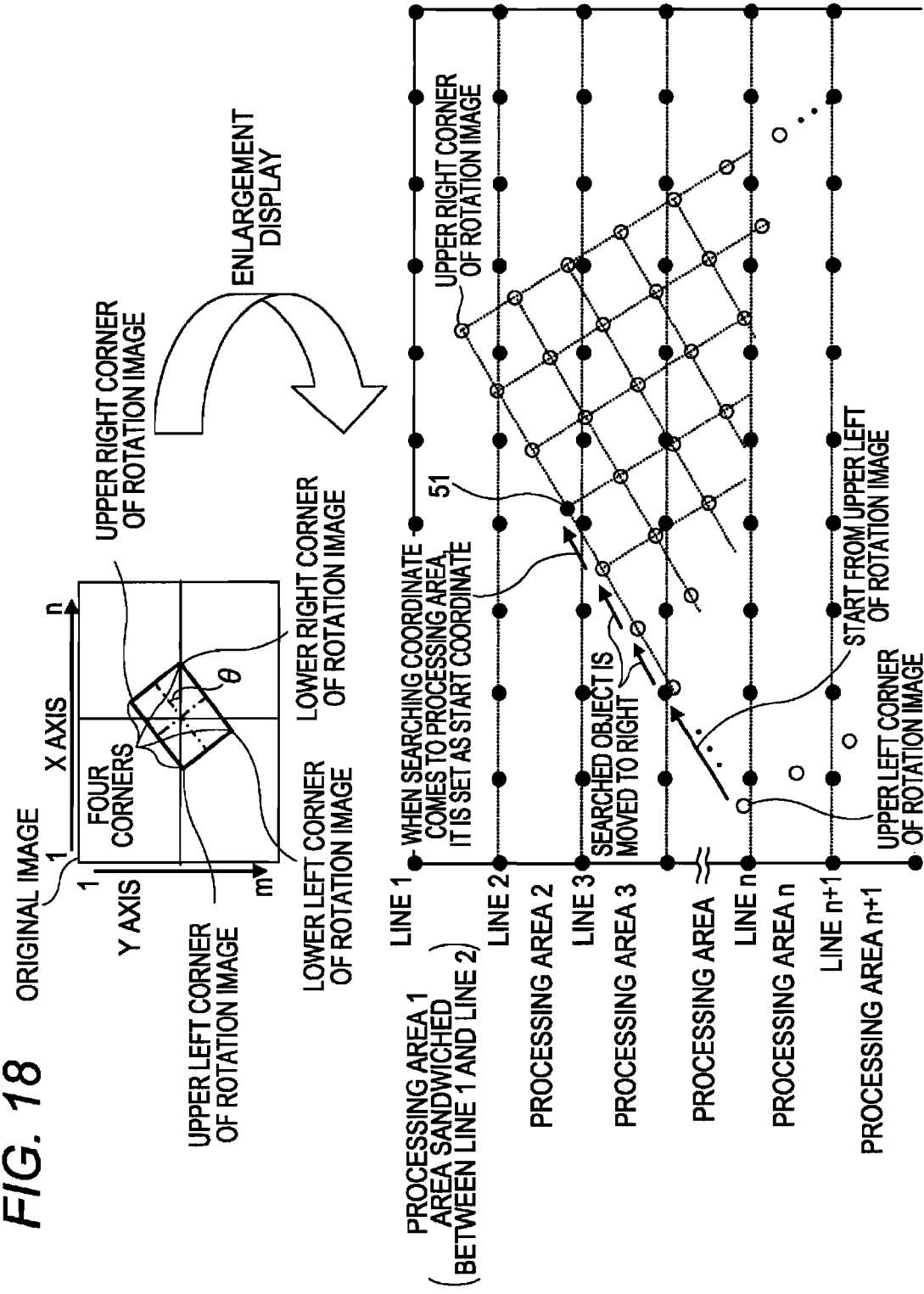
FIG. 18 illustrates an operation for searching for a coordinate at the time of calculating a start coordinate in the area when the reference coordinate of the output rotation image for the original image is calculated.

Details of the calculation of the start coordinate in the processing area is described below. FIG. 18 illustrates a coordinate searching operation at the time of calculating the start coordinate in the area when the reference coordinate of the output rotation image for the original image is calculated.

When the start coordinate is calculated, any one of the coordinates of the four corners on the output rotation image obtained at the head of the frame is used as a start point, and adjacent pixels are searched one by one. A portion of the area (processing area) in the memory section 23 having data which is searched firstly is a start coordinate. The searching refers to comparing reference coordinates of pixels of the output rotation image along Y-axis one by one and simultaneously moving the same.

In FIG. 18, the pixel at the lower left corner is started to be searched, and pixels are searched to a right direction, and a pixel 51 whose searching coordinate comes to the processing area is set as the start coordinate. An X component and a Y component which are obtained based on the rotating angle by the angle-to-sine/cosine converting section 24 as shown in FIG. 19A are used for the movement of the reference coordinates.

Figures 19A, 19B:
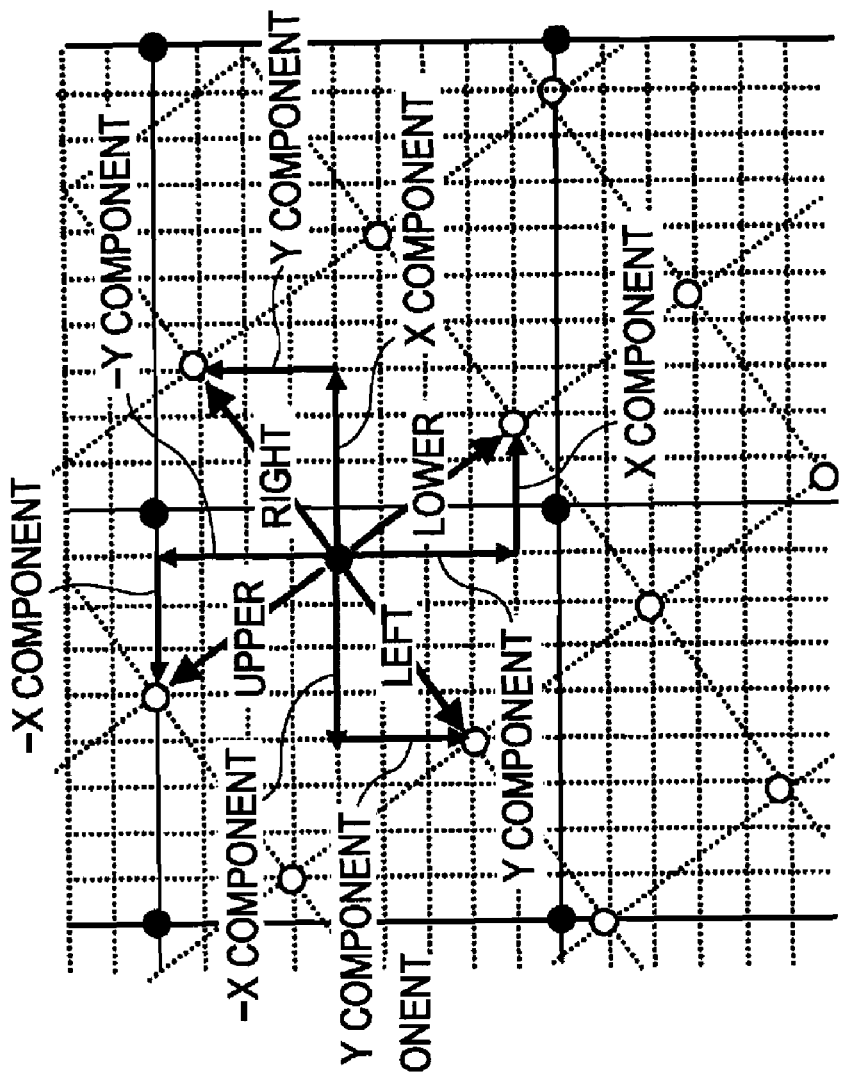
FIGS. 19A and 19B illustrate definition of a moving operation in the embodiment.

As shown in FIG. 19B, to add the X component in FIG. 19A to the reference coordinates and to subtract the Y component from the reference coordinates are movements to the right direction, and to subtract the X component and to subtract the Y component are movements to the upper direction. To add the X component and to add the Y component are movements to the lower direction, and to subtract the X component and to subtract the Y component are movements to the left direction.

In FIG. 18, when the upper right corner is searched as the start coordinate, the end coordinate is searched.

Figure 20A:
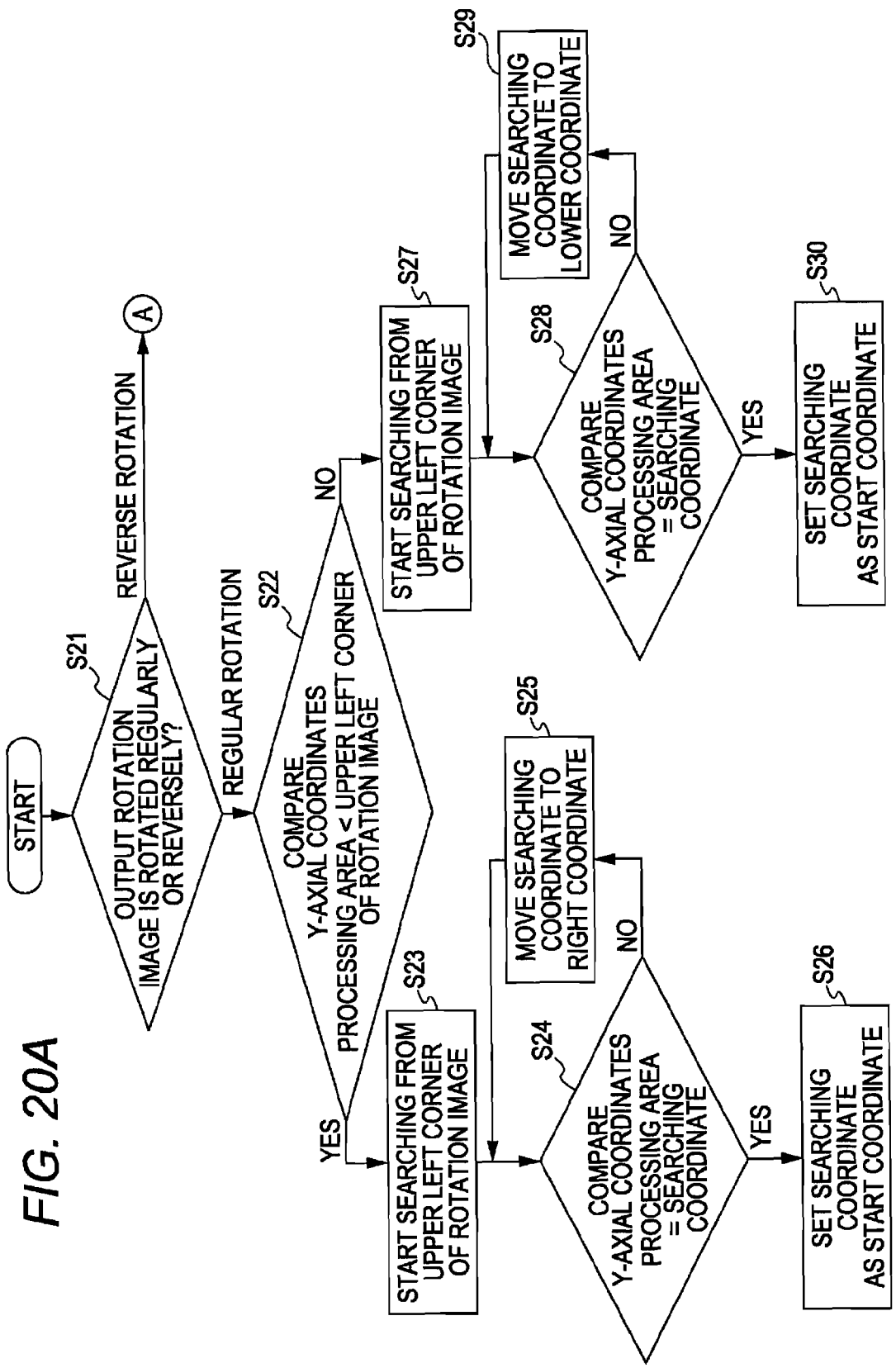

FIGS. 20A and 20B are flow charts illustrating the details of the searching process for the start coordinate. The process in FIG. 20A corresponds to a part of the process at S14 in FIG. 15. At the start of the process in FIG. 20A, a determination is made at S21 whether the image rotating process is regular rotation or reverse rotation based on the rotating angle input as the parameter data 22. As a result, when the process is the regular rotation (regular rotation at S21), an Y-axial coordinate of the processing area is compared with an Y-axial coordinate of the upper left corner of the output rotation image at S22. As a result, when the processing area< the upper left corner of the output rotation image (YES at S22), the searching is started on the upper left corner of the output rotation image at S23.

The processing area is compared with the Y-axial coordinate of the searching coordinate at S24. When both of them do not match (NO at S24), the X component in FIG. 19A is added to the X-axial coordinate of the searching coordinate, and the Y component in FIG. 19A is subtracted from the Y-axial coordinate of the searching coordinate, and the searching coordinate is moved to one right coordinate at S25. Then, the process returns to S24. When both of them match at S24 (YES at S24), the searching coordinate is set as the start coordinate at S26, and this process is ended.

As a result of the comparison of the Y-axial coordinates, when the processing area< the upper left corner of the output rotation image does not hold at S22 (NO at S22), the searching is started on the upper left corner of the output rotation image at S27.

The processing area is compared with the Y-axial coordinate of the searching coordinate at S28. When both of them do not mach (NO at S28), the X component in FIG. 19A is added to the X-axial coordinate of the searching coordinate, and Y component in FIG. 19A is added to the Y-axial coordinate of the searching coordinate, and the searching coordinate is moved to one lower coordinate at S29. Then, the process returns to S28. When both of them match at S28 (YES at S28), the searching coordinate is set as the start coordinate and this process is ended at S30.

If a determination is made at S21 that the image rotating process is the reverse rotation (reverse rotation at S21), in FIG. 20B, the Y-axial coordinate of the processing area is compared with the Y-axial coordinate at the lower left corner of the output rotation image at S31. As a result, when the processing area< the lower left corner of the output rotation image (YES at S31), the searching is started on the lower left corner of the output rotation image at S32.

The processing area is compared with the Y-axial coordinate of the searching coordinate at S33. When both of them do not match (NO at S33), the X component in FIG. 19A is added to the X-axial coordinate of the searching coordinate, and the Y component in FIG. 19A is subtracted from the Y-axial coordinate of the searching coordinate and the searching coordinate is moved to one lower coordinate at S34. Then, the process returns to S32. When both of them match at S32 (YES at S32), the searching coordinate is set as the start coordinate at S35, and this process is ended.

As a result of the comparison of the Y-axial coordinates, when the processing area< the lower left corner of the output rotation image does not hold at S31 (NO at S31), the searching is started on the lower left corner of the output rotation image at S36.

The processing area is compared with the Y-axial coordinate of the searching coordinate at S37. When both of them do not match (NO at S37), the X component in FIG. 19A is added to the X-axial coordinate of the searching coordinate, and the Y component in FIG. 19A is subtracted from the Y-axial coordinate of the searching coordinate and the searching coordinate is moved to one right coordinate at S36. Then, the process returns to S38. When both of them match at S38 (YES at S38), the searching coordinate is set as the start coordinate at S39, and this process is ended.

Figure 21A:
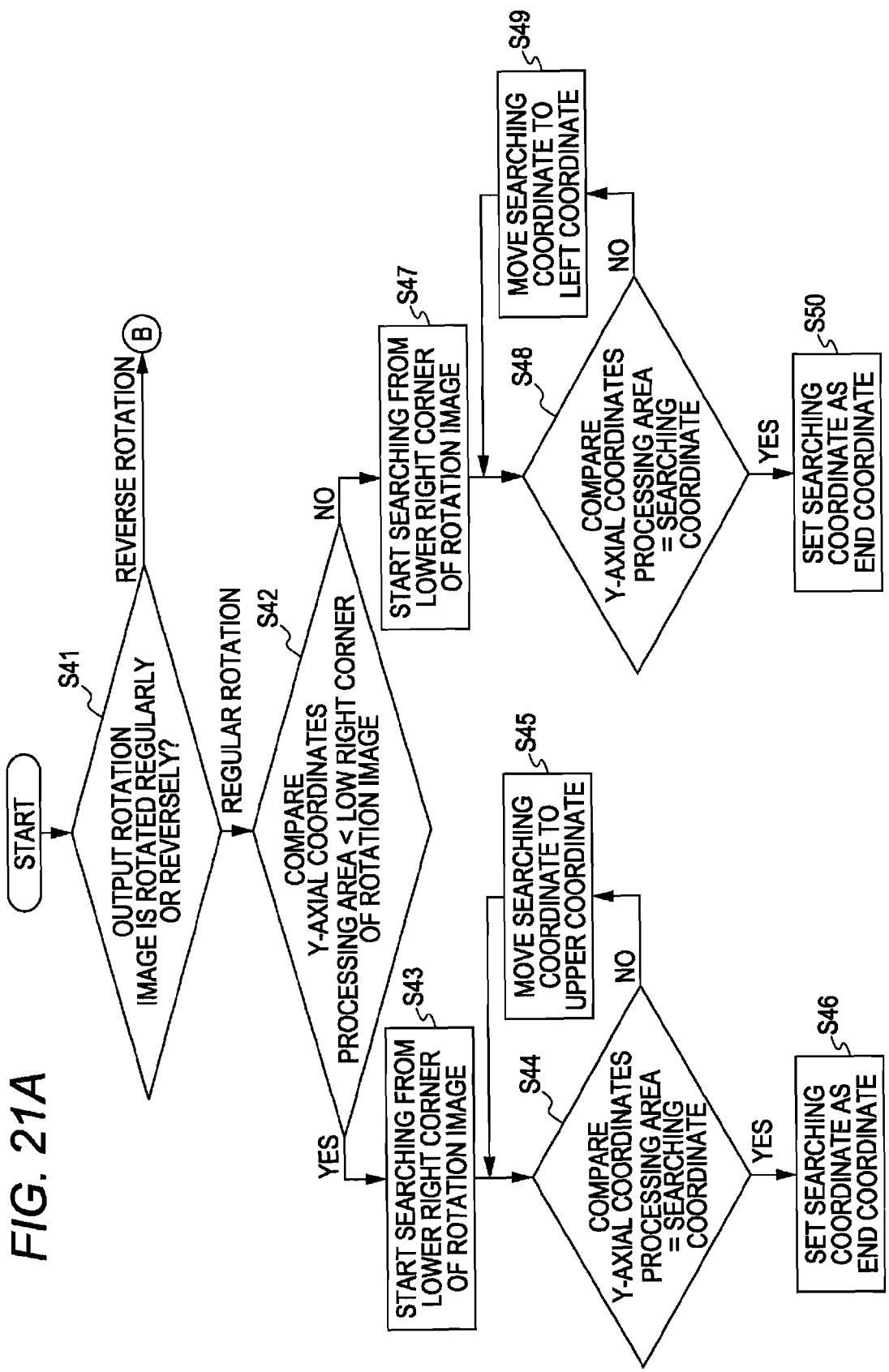
FIGS. 21A and 21B are flow charts illustrating details of the searching process of an end coordinate.
Figure 21B:
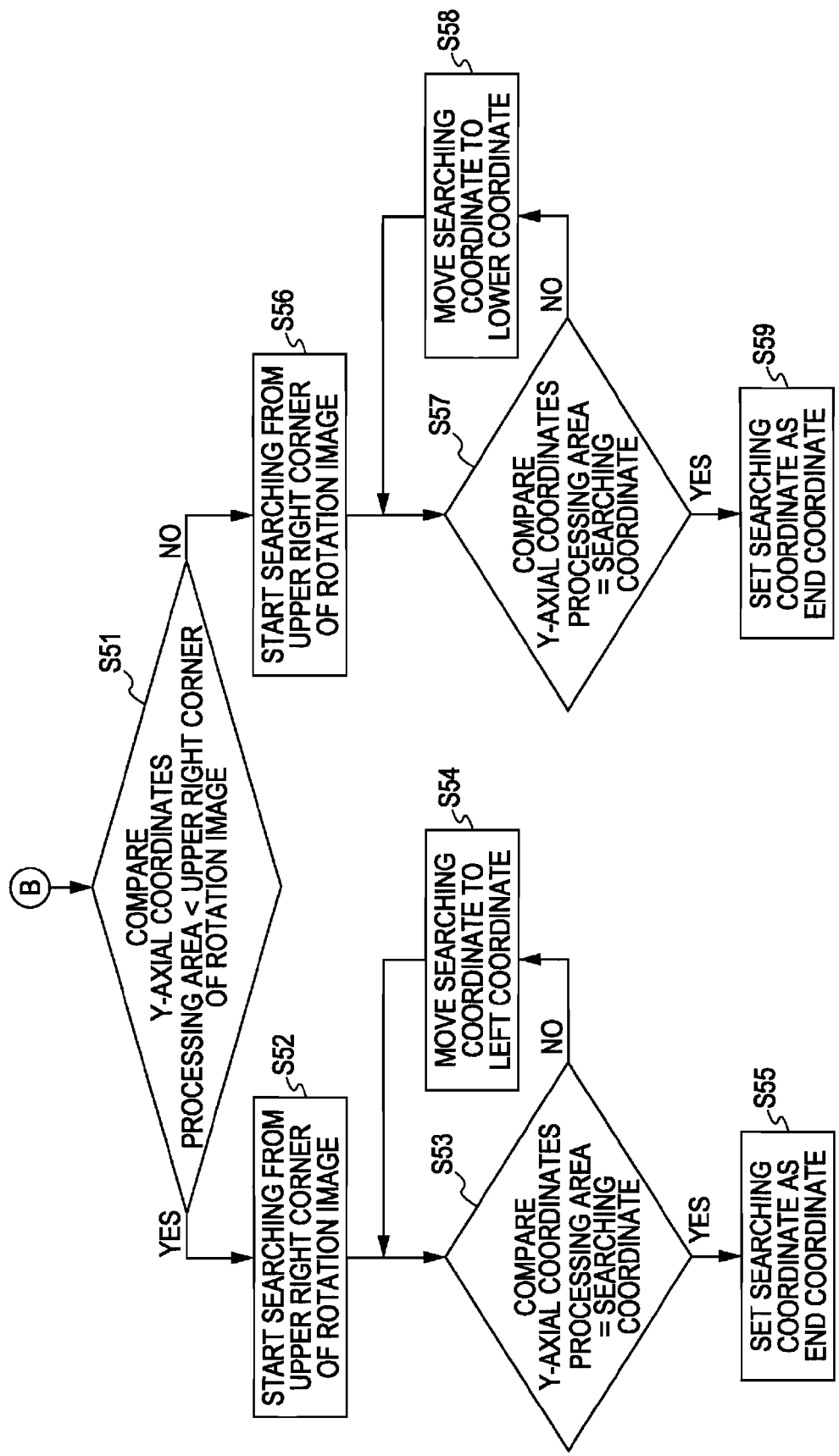

FIGS. 21A and 21B are flow charts illustrating details of the searching process for the end coordinate. The process in FIG. 21A corresponds to a part of the process at S14 in FIG. 15. At the start of the process in FIG. 21A, a determination is made at S41 whether the image rotating process is regular rotation or reverse rotation based on the rotating angle input as the parameter data 22. As a result, when the process is the regular rotation (regular rotation at S41), the Y-axial coordinate of the processing area is compared with the Y-axial coordinate of the lower right corner of the output rotation image at S42. As a result, when the processing area< the lower right corner of the output rotation image (YES at S42), the searching is started on, the lower right corner of the output rotation image at S43.

The processing area is compared with the Y-axial coordinate of the searching coordinate at S44. When both of them do not match (NO at S44), the X component in FIG. 19A is subtracted from the X-axial coordinate of the searching coordinate, and the Y component in FIG. 19A is subtracted from the Y-axial coordinate of the searching coordinate, and the searching coordinate is moved to one upper coordinate at S45. Then, the process returns to S44. When both of them match at S44 (YES at S44), the searching coordinate is set as the end coordinate at S46 so that this process is ended.

As a result of the comparison of the Y-axial coordinates, when the processing area< the lower right corner of the output rotation image does not hold at S42 (NO at S42), the searching is started on the lower right corner of the output rotation image at S47.

The processing area is compared with the Y-axial coordinate of the searching coordinate at S48. When both of them do not mach at S48 (NO at S48), the X component in FIG. 19A is subtracted from the X-axial coordinate of the searching coordinate, and Y component in FIG. 19A is added to the Y-axial coordinate of the searching coordinate, and the searching coordinate is moved to one left coordinate at S49, so that the process returns to S48. When both of them match at S48 (YES at S48), the searching coordinate is set as the start coordinate and this process is ended at S50.

If, the determination is made at S41 that the image rotating process is the reverse rotation (reverse rotation at S41), in FIG. 21B, the Y-axial coordinate of the processing area is compared with the Y-axial coordinate at the upper right corner of the output rotation image at S51. As a result, when the processing area< the upper right corner of the output rotation image (YES at S51), the searching is started on the upper right corner of the output rotation image at S52.

The processing area is compared with the Y-axial coordinate of the searching coordinate at S53. When both of them do not match (NO at S53), the X component in FIG. 19A is subtracted from the X-axial coordinate of the searching coordinate, and the Y component in FIG. 19A is added to the Y-axial coordinate of the searching coordinate and the searching coordinate is moved to one left coordinate at S54. Then, the process returns to S52. When both of them match at S52 (YES at S52), the searching coordinate is set as the end coordinate at S55, and this process is ended.

As a result of the comparison of the Y-axial coordinates, when the processing area< the upper right corner of the output rotation image does not hold at S51 (NO at S51), the searching is started on the upper right corner of the output rotation image at S56.

The processing area is compared with the Y-axial coordinate of the searching coordinate at S57. When both of them do not match (NO at S57), the X component in FIG. 19A is added to the X-axial coordinate of the searching coordinate, and the Y component in FIG. 19A is added to the Y-axial coordinate of the searching coordinate and the searching coordinate is moved to one lower coordinate at S56, so that the process returns to S58. When both of them match at S58 (YES at S58), the searching coordinate is set as the end coordinate at S59, and this process is ended.

FIG. 22 illustrates an operating flow at the time of calculating the reference coordinates of the output rotation image for the original image at S16 and S17 in FIG. 15. The operation differs between the regular rotation and the reverse rotation of the output rotation image, and FIG. 22 illustrates the regular rotating operation.

The process sequence numbers (220) to (230) in FIG. 22 show the sequence of the coordinate calculation. In FIG. 22, each coordinate moves by each one pixel from the start coordinate (220) to the end coordinate (230) in the processing area without running off the processing area so that the image is output. The coordinate is moved from the start coordinate (220) to the right adjacent coordinate (222). At this time, the coordinate cannot be moved to the lower adjacent coordinate because it is out of the processing area. When the coordinate cannot be moved to the lower adjacent coordinate, the jump flag is kept OFF. Similarly to the movement from the coordinate (220) to the coordinate (222), the coordinate moves from the coordinate (222) to the coordinate (223).

When the coordinate moves from the coordinate (223) to the right adjacent one, it is out of the processing area, and thus the coordinate cannot move to right adjacent one. Since the lower movement is enabled on the coordinate (223), the jump flag is turned ON. Since the coordinate cannot move from the coordinate (223) to right adjacent one and the jump flag is ON, the coordinate moves to a lower adjacent coordinate (224), and the jump flag is turned OFF.

Since the searching coordinate cannot move from the coordinate (224) to lower adjacent one, the jump flag is held OFF, but since the coordinate can move to right adjacent one, moves to a right adjacent coordinate (225). Since the coordinate can move from the coordinate (225) to lower adjacent one, the jump flag is turned ON, and since can move also to right adjacent one, moves to a right adjacent coordinate (226).

The searching coordinate cannot move from the coordinate (226) to right adjacent one because it is out of the processing area. Since the jump flag is ON on the coordinate (225), the searching coordinate moves to a coordinate (227) lower adjacent to the coordinate (225), and the jump flag is turned OFF.

Since the searching coordinate cannot move from the coordinate (227) to lower adjacent one, the jump flag is held OFF, and moves to a right adjacent coordinate (228). Since the searching coordinate cannot move from the coordinate (228) to lower adjacent one, the jump flag is turned OFF, but since can move to right adjacent one, moves to a right adjacent coordinate (229).

When the searching coordinate moves from the coordinate (229) to a right adjacent one, it is out of the processing area. For this reason, the searching coordinate cannot move to right adjacent one. Since the searching coordinate can move from the coordinate (229) to lower adjacent one, the jump flag is turned ON. Since the searching coordinate cannot move from the coordinate (229) to right adjacent one and the jump flag is ON, it moves to a lower adjacent coordinate (230), and the jump flag is turned OFF. Since the coordinate (230) is the end coordinate, the coordinate calculating process is ended.

In such a manner, the reference coordinates of the output rotation image for the original image in the processing area per frame of the input image are calculated, interpolated, rearranged and output. This process is executed every time data for one line of the original image is input into the memory section 23. For this reason, the capacity of the memory section 23 can be reduced.

Figure 23A:
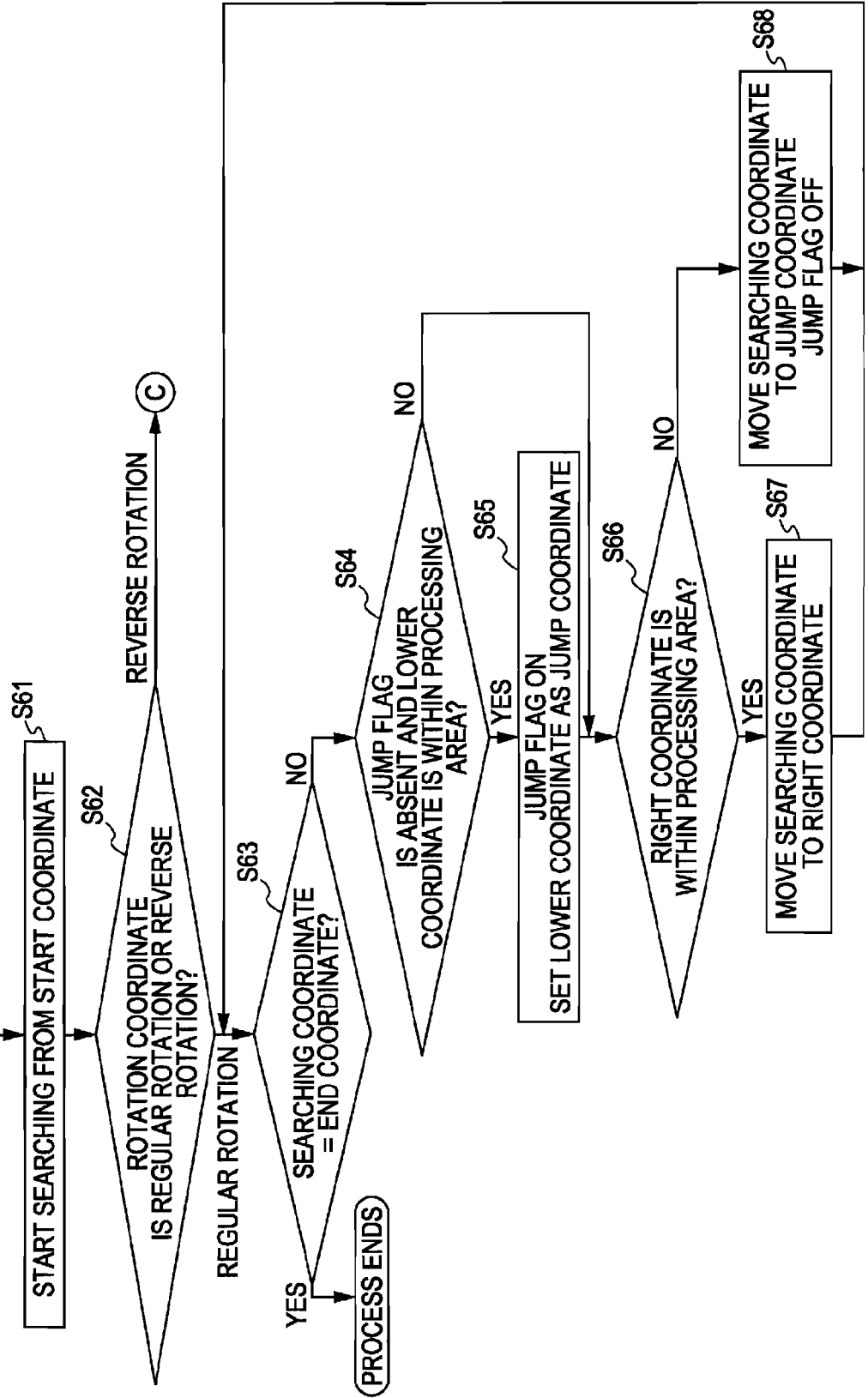
FIGS. 23A and 23B illustrates operation flows at the time of calculating the reference coordinate of the output rotation image for the original image.
Figure 23B:
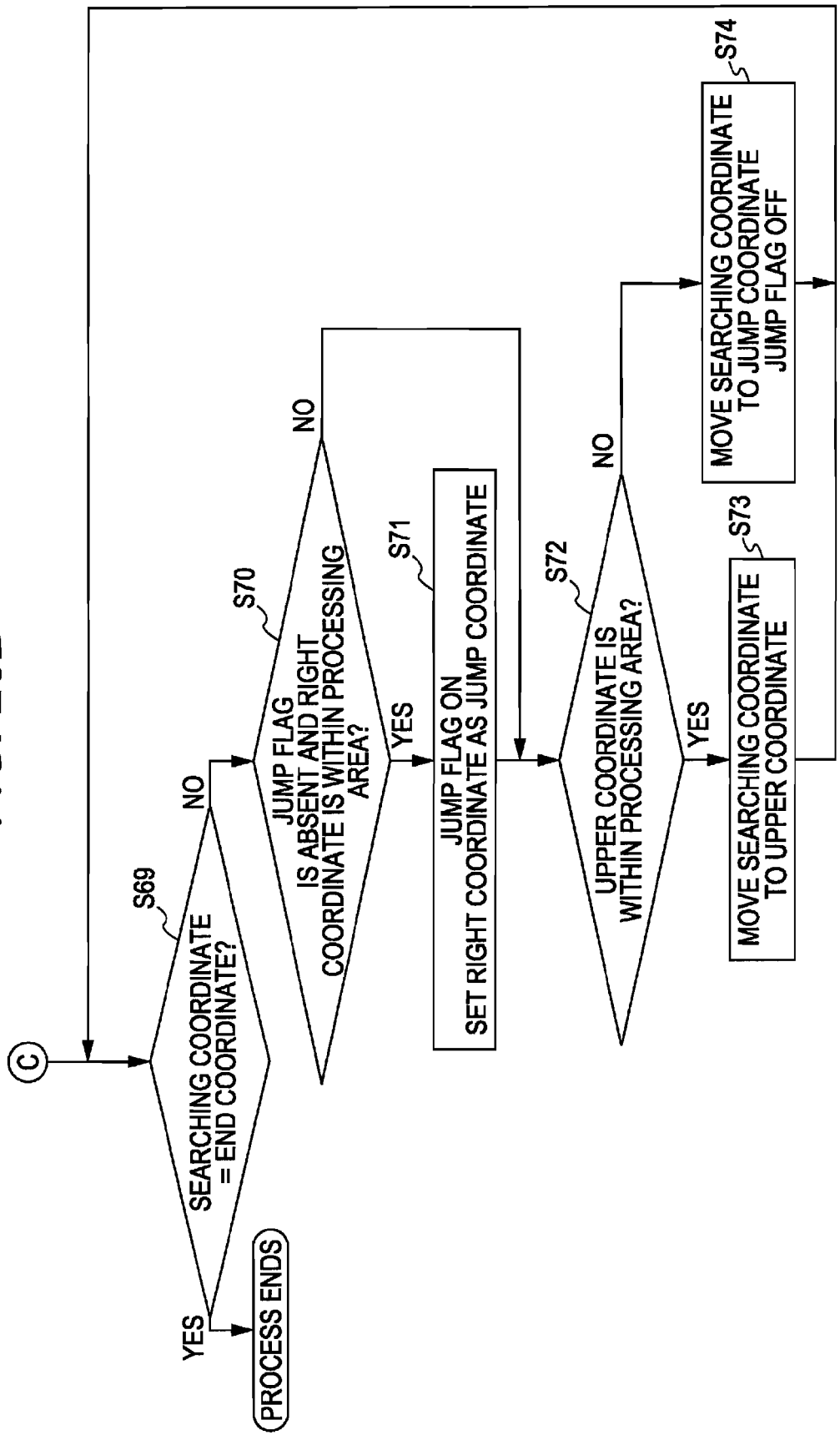

FIGS. 23A and 23B are flow charts illustrating details of the reference coordinate calculating process of the output rotation image for the original image. The process in FIG. 23A corresponds to S16 and S17 of the flow chart in FIG. 15. When the process in FIG. 23A is started, since the searching is started from the start coordinate in the processing area, the searching coordinate is set as the start coordinate and this coordinate is output at S61.

A determination is made at S62 whether the rotating process is the regular rotation or the reverse rotation based on the rotating angle given as the parameter data 22. As a result, when the rotating process is the regular rotation (the value of the rotating angle is positive) (regular rotation at S62), a determination is made at S63 that the searching coordinate is the end coordinate.

As a result of the determination at S63, when the searching coordinate is not the end coordinate (NO at S63), if a coordinate where the jump flag is ON is absent and a lower adjacent coordinate is within the processing area at S64 (YES at S64), the jump flag is turned ON and the coordinate lower adjacent to the searching coordinate is set as a jump coordinate at S65. When a coordinate where the jump flag is ON is not absent and the lower adjacent coordinate is not within the processing area at S64 (NO at S64), the process at S65 is skipped.

A determination is made at S66 whether a coordinate right adjacent to the searching coordinate is within the processing area. When this coordinate is within the processing area (YES at S66), and the searching coordinate is moved to the right adjacent coordinate, and the right adjacent coordinate is output at S67, so that the process returns to S63. When the coordinate right adjacent to the searching coordinate is not within the processing area at S66 (NO at S66), the searching coordinate is moved to the jump coordinate and this coordinate is output and the jump flag is turned OFF at S68. Thereafter, the process returns to S63.

When the searching coordinate is the end coordinate at S63 (YES at S63), this process is ended. As a result of the determination at S62, when the process is the reverse rotation (the value of the rotating angle is negative) (reverse rotation at S62), in FIG. 23B, a determination is made at S69 whether the searching coordinate is the end coordinate.

As a result of the determination at S69, when the searching coordinate is not the end coordinate (NO at S69), the process goes to S70. When a coordinate where the jump flag is ON is absent and the right adjacent coordinate is within the processing area at S70 (YES S70), the process goes to S71. The jump flag is turned ON and the coordinate right adjacent to the searching coordinate is set as the jump coordinate at S71. When a coordinate where the jump flag is ON is not absent and a right adjacent coordinate is not within the processing area (NO at S70), S71 is skipped.

A determination is made at S72 whether a coordinate upper adjacent to the searching coordinate is within the processing area. When the coordinate is within the processing area (YES at S72), the searching coordinate is moved to the upper adjacent coordinate and this coordinate is output at S73. Thereafter, the process returns to S69. If the determination is made at S72 that the coordinate right adjacent to the searching coordinate is not within the processing area (NO at S72), the searching coordinate is moved to the jump coordinate and this coordinate is output, and the jump flag is turned OFF at S74. Thereafter, the process returns to S69.

When the searching coordinate is the end coordinate at S69 (YES at S69), this process is ended. In such a manner, the reference coordinates from the start coordinate to the end coordinate of the output rotation image for the original image in the processing area are calculated in the order of inputting the original image data.

The reference coordinates are interpolated so that the converted data are obtained. The converted data acquired in the interpolating process are rearranged so that data of the output rotation image are output.

According to this embodiment, since the pixel data of the output rotation image can be generated in the order of input original image data, all the original image data do not have to be stored, and thus the memory capacity can be reduced.

When the specification of the rotating angle is changed and the conversion tables are used for the coordinate conversion, this is substituted for the calculation such as trigonometrical function and division. Therefore, a circuit required for such a calculation can be reduced.

Further, the enlarging process and the simultaneous rotating process contribute to the reduction in circuits.

The embodiments can be implemented in computing hardware (computing apparatus) and/or software, such as (in an unlimiting example) any computer that can store, retrieve, process and/or output data and/or communicate with other computers. The computer (e.g., the image recognizer device 20, etc.) comprises a controller (CPU) and a display device. The results produced can be displayed on a display of the computing hardware. A program/software implementing the embodiments may be recorded on computer readable media comprising computer-readable recording media. The program/software implementing the embodiments may also be transmitted over a transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Examples of transmission communication media include a carrier-wave signal, an optical signal, etc. Further, according to an aspect of the embodiments, any combinations of the described features, functions and/or operations, including benefits thereof, can be provided and/or achieved.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image recognition device for generating an output rotation image from input original image data, comprising:
   a memory section which stores data of a line including pixels of the original image data to be processed and a line including pixels to be used for an interpolating process therein;
   an angle-to-sine/cosine converting section which obtains an X component and a Y component where a pixel interval of the original image data is an oblique side based on a rotating angle;
   a coordinate searching section which calculates reference coordinates of the output rotation image for the original image using the X component and the Y component in order of input of the original image data;
   an interpolating section which executes an interpolating process when the reference coordinates are not present; and
   a rearranging section which rearranges converted data acquired in the interpolating process and outputting data of the output rotation image,
   wherein the angle-to-sine/cosine converting section, the coordinate searching section and the interpolating section process pixels upon reception of a timing pulse indicating a head of an image frame of the input original image.

2. The image recognition device according to claim 1, wherein the angle-to-since/cosine converting section has a conversion table, and refers to the conversion table as to the rotating angle so as to obtain the X component and the Y component.

3. The image recognition device according to claim 1, wherein the memory section has a capacity of data for two lines of the original image data.

4. The image recognition device according to claim 1, wherein the angle-to-sine/cosine converting section obtains the X component and the Y component where the oblique side is 1/n times as large as the pixel interval of the original image data.

5. The image recognition device according to claim 1, wherein the angle-to-sine/cosine converting section obtains an effective range from a range of the original image data to be processed, and the coordinate searching section does not process data for line which is out of the effective range.

6. The image recognition device according to claim 5, wherein the input original image data includes the timing pulse indicating the head of the image frame of the input original image, and the angle-to-sine/cosine converting section receives the timing pulse so as to obtain the X component, the Y component and the effective range.

7. The image recognition device according to claim 1, wherein the coordinate searching section obtains a start coordinate and an end coordinate for calculating the reference coordinate in advance, and calculates the reference coordinate between the start coordinate and the end coordinate.

8. The image recognition device according to claim 1, wherein the interpolating section executes the interpolating process using a bilinear method.

9. The image recognition device according to claim 8, further comprising a memory read address control section which obtains addresses in the memory section of peripheral four pixels necessary for the interpolating section to execute the interpolation using the bilinear method.

10. The image recognition device according to claim 1, wherein the coordinate searching section calculates the reference coordinate and the interpolating section executes the interpolating process according to a pipeline process.

11. The image recognition device according to claim 1, wherein the coordinate searching section calculates the reference coordinate per area between the lines of the original image data.

12. An image rotating method generating an output rotation image from input original image data, comprising:
pixel processing on a processing area-by-processing area basis within an image frame of the input original image upon reception of a timing pulse indicating a head of the image frame,
obtaining an X component and a Y component where a pixel interval of the original image data is an oblique side based on a rotating angle,
calculating a reference coordinate of the output rotation image for the original image using the X component and the Y component in order of input of the original image data, and
interpolating the reference coordinate; and
rearranging converted data obtained in the interpolating process and outputting data of the output rotation image.

13. An apparatus generating an output rotated image from input original image data, comprising:
a controller to execute:
pixel processing on a processing area-by-processing area basis within an image frame of the input original image upon reception of a timing pulse indicating a head of the image frame, by:
obtaining an X component and a Y component where a pixel interval of the original image data is an oblique side based on a rotating angle,
calculating a reference coordinate of the output rotation image for the original image using the X component and the Y component, and
interpolating the reference coordinates; and
outputting data of the output rotated image, based upon the reference coordinate.

* * * * *

UNITED STATES PATENT AND TRADEMARK OFFICE
CERTIFICATE OF CORRECTION

PATENT NO. : 8,139,895 B2
APPLICATION NO. : 12/050513
DATED : March 20, 2012
INVENTOR(S) : Satoshi Nishimura et al.

It is certified that error appears in the above-identified patent and that said Letters Patent is hereby corrected as shown below:

Column 14, Line 67, In Claim 2, delete "angle-to-since/cosine" and insert -- angle-to-sine/cosine --, therefor.

Column 16, Line 10, In Claim 12, delete "frame," and insert -- frame, by: --, therefor.

Signed and Sealed this
Twenty-ninth Day of May, 2012

David J. Kappos
*Director of the United States Patent and Trademark Office*